(12) United States Patent
Reuze et al.

(10) Patent No.: US 11,570,434 B2
(45) Date of Patent: Jan. 31, 2023

(54) GEOMETRIC PARTITION MODE WITH HARMONIZED MOTION FIELD STORAGE AND MOTION COMPENSATION

(71) Applicant: QUALCOMM Incorporated, San Diego, CA (US)

(72) Inventors: Kevin Pascal Andre Reuze, Thorigne-Fouillard (FR); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 33 days.

(21) Appl. No.: 16/998,639

(22) Filed: Aug. 20, 2020

(65) Prior Publication Data

US 2021/0058617 A1 Feb. 25, 2021

Related U.S. Application Data

(60) Provisional application No. 62/891,138, filed on Aug. 23, 2019.

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/105* (2014.11); *H04N 19/132* (2014.11); *H04N 19/176* (2014.11)

(58) Field of Classification Search
CPC .. H04N 19/119; H04N 19/105; H04N 19/132; H04N 19/176; H04N 19/154;
(Continued)

(56) References Cited

U.S. PATENT DOCUMENTS

| 9,020,043 B2* | 4/2015 | Panusopone ........... H04N 19/61 375/240.24 |
| 2010/0208827 A1* | 8/2010 | Divorra Escoda ..... H04N 19/61 375/240.24 |
| 2020/0359020 A1* | 11/2020 | Ahn ..................... H04N 19/139 |

OTHER PUBLICATIONS

Chen J, et al., "Algorithm Description for Versatile Video Coding and Test Model 5 (VTM 5)", 126. MPEG Meeting; Mar. 19, 2019-Mar. 27, 2019; Geneva; (Motion Picture Expert Group or ISO/I EC JTC1/SC29/WG11), JVET-N1002-v2, No. m48054, Jun. 11, 2019 (Jun. 11, 2019), XP030212630, Retrieved from the Internet: URL: http://phenix.int-evry.fr/mpeg/doc_end_user/documents/126_Geneva/wg11/m48054-JVET-N1002-v2-JVET-N1002-v2.zip JVET-N1002-v2.docx, [retrieved on Jun. 11, 2019], 76 pages.

(Continued)

*Primary Examiner* — Susan E. Torgerson
(74) *Attorney, Agent, or Firm* — Shumaker & Sieffert, P.A.

(57) ABSTRACT

A method of decoding video data includes determining that a geometric partition mode is enabled for a current block of the video data and determining a split line dividing the current block into a first partition and a second partition, where determining the split line comprises selecting an angle for the split line from a plurality of angles, Each angle of the plurality of angles corresponding to an N:M ratio of samples of the current block, where N and M are integers. The split line is not at a corner of the current block. The method further includes determining geometric mode weights for the current block using the angle of the split line, generating a first prediction block using motion information for the first partition, and generating a second prediction block using motion information for the second partition.

30 Claims, 19 Drawing Sheets

SPLITTING FROM TOP-LEFT CORNER TO BOTTOM-RIGHT CORNER

SPLITTING FROM TOP-RIGHT CORNER TO BOTTOM-LEFT CORNER

(51) Int. Cl.
H04N 19/105 (2014.01)
H04N 19/176 (2014.01)

(58) Field of Classification Search
CPC .... H04N 19/51; H04N 19/537; H04N 19/567; H04N 19/70
USPC ......................................................... 375/240
See application file for complete search history.

(56) References Cited

OTHER PUBLICATIONS

Esenlik (Huawei) S., et al., "Non-CE4: Geometrical Partitioning for Inter Blocks", Joint Video Experts Team (JVET) of ITU-T SG.16 WP3 and ISO/IEC JTC 1/SC29/WG11, 15. JVET Meeting, Jul. 3, 2019-Jul. 12, 2019, Gothenburg, (TheJoint Video Exploration Team of ISO/IEC JTC1/SC29/WG11 and ITU-TSG.16), No. JVET-O0489, Jul. 7, 2019 (Jul. 7, 2019), pp. 1-9, XP030219723, Retrieved from the Internet: URL: http://phenix.int-evry.fr/jvet/doc_end_user/documents/15_Gothenburg/wg11/JVET-O0489-v4.zip JVET-O0489_v4.docx [retrieved on Jul. 7, 2019].

Reuze K., et al., "CE4-related: Simplification of GEO Using Angles with Power-of-Two Tangents", JVET-P0264-v4, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.

Bossen F., "VTM-5.0, Tags, JVET/VVCSoftware_VTM, GitLab," JVET, https://vcgit.hhi.fraunhofer.de/jvet/VVCSoftware_VTM/-/tags/VTM-5.0, Jun. 2019, pp. 1-3.

Gao H., et al., "CE4: CE4-1.1, CE4-1.2 and CE4-1.14: Geometric Merge Mode (GEO)", 16th Meeting: Geneva, CH, Oct. 1-11, 2019, (The Joint Video Exploration Team of ISO/IEC JTC1/SC29/WG11 and ITU-T SG.16), No. JVET-P0068-V1, pp. 1-6.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.

Liao (Panasonic) R L., et al., "CE10.3.1.b: Triangular Prediction Unit Mode", 12. JVET Meeting, Oct. 3, 2018-Oct. 12, 2018, MACAO, (The Joint Video Exploration Team of ISO/IEC JTC 1/SC 29/WG 11 and ITU-T SG.16), No. JVET-L0124-V2, Nov. 1, 2018 (Nov. 1, 2018), XP030198593, 8 Pages Retrieved from the Internet: URL: http://phenix.int-evry.fr/jvet/doc_end_user/documents/12_Macao/wg11/JVET-L0124-v6.zip JVET-L0124-v2.doc.

International Search Report and Written Opinion—PCT/US2020/047426—ISA/EPO—dated Nov. 3, 2020 (17 pp).

Esenlik (Huawei) S., et al., "Non-CE4: Geometrical Partitioning for Inter Blocks", 15. JVET Meeting, Jul. 3, 2019-Jul. 12, 2019, Gothenburg, (The Joint Video Exploration Team of ISO/IEC JTC1/SC29/WG11 and ITU-TSG.16), No. JVET-O0489, Jul. 7, 2019 (Jul. 7, 2019), XP030219722, pp. 1-19, Retrieved from the Internet: URL: http://phenix.int-evry.fr/jvet/doc_end_user/documents/15_Gothenburg/wg11/JVET-O0489-v4.zip JVET-O0489pptx [retrieved on Jul. 7, 2019].

Gao H., et al., "CE4-1: Geometric Inter Prediction with 64 Modes", JVET-Q0059-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.

Gao H., et al., "CE4-Related: Geometric Merge Mode (GEO) Simplifications", JVET-P0107-v3, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-9.

Gao H., et al., "Simplified GEO without Multiplication and Minimum Blending Mask Storage (harmonization of JVET-P0107, JVET-P0264 and JVET-P0304)", JVET-P0884-v5, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-9.

Liao R-L., et al., "CE4-related: Simplification of Blending Weights and Motion Field Storage in Geometric Merge Mode", JVET-P0304-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.

Reuze., et al., "Simplified GEO without multiplication and minimum blending mask storage (harmonization of JVET-P0107, JVET-P0264 and JVET-P0304)," Joint Video Experts Team (JVET) of ITU-T SG 16 WP 3 and ISO/IEC JTC 1/SC 29/WG 11, 16th Meeting: Geneva, CH, Oct. 1-11, 2019, JVET-P0885-v4, pp. 1-6.

Chen, J. et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, Doc. No. JVET-P2002-v1 (Nov. 10, 2019) (Year: 2019) 91 pp.

Chen C-C., et al., "CE4: Summary Report on Inter Prediction", JVET-P0024-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-8.

Blaser M., et al., "Description of SDR and 360° Video Coding Technology Proposal by RWTH Aachen University", Joint Video Experts Team (JVET) of ITU-T SG 16 WP 3 and ISO/IEC JTC 1/SC 29/WG 11, 10th Meeting, San Diego, US, Apr. 10-20, 2018, JVET-J0023-v1, pp. 1-60, 101 pages.

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, Document JCTVC-L1003_v34, 12th Meeting, Geneva, CH, Jan. 14-23, 2013, pp. 21-23, 310 pages.

Bross B., et al., "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by Teleconference, Jun. 22-Jul. 1, 2020, pp. 22-25, 548 Pages.

Bross B., et al., "Versatile Video Coding (Draft 5)", Joint Video Experts Team (JVET) of ITU-T SG 16 WP 3 and ISO/IEC JTC 1/SC 29/WG 11,14th Meeting: Geneva, CH, Mar. 19-27, 2019, JVET-N1001-V3, pp. 18-21, 371 pages.

Bross B., et al., "Versatile Video Coding (Draft 6)", 127th MPEG, Jul. 8, 2019-Jul. 12, 2019, 15th JVET Meeting, Gothenburg, SE, Jul. 3, 2019-Jul. 12, 2019, Joint Video Experts Team (JVET) of ITU-T SG 16 WP 3 and ISO/IEC JTC 1/SC 29/WG 11, 15th Meeting (Motion Picture Expert Group or JVET of ISO/IEC JTC1/SC29/WG11 and ITU-T SG 16 WP 3), No. m49908, JVET-02001-vE, Jul. 15, 2019 (Jul. 15, 2019), XP030208562, pp. 21-24, 455 Pages.

Chen C-C., et al., "Description of Core Experiment 4 (CE4): Inter Prediction with Geometric Partitioning", JVET-P2024-v2, Joint Video Experts Team (JVET) of ITU-T SG 16 WP 3 and ISO/IEC JTC 1/SC 29/WG 11, 16th Meeting, Geneva, CH, Oct. 1-11, 2019, 5 pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, pp. 23-25, 696 Pages.

\* cited by examiner

| MERGE INDEX | L0 MV | L1 MV |
|---|---|---|
| 0 | X | |
| 1 | | X |
| 2 | X | |
| 3 | | X |
| 4 | X | |

GEOMETRIC PARTITION MODE WITH HARMONIZED MOTION FIELD STORAGE AND MOTION COMPENSATION

This application claims the benefit of U.S. Provisional Application No. 62/891,138, filed on Aug. 23, 2019 which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding. More specifically, the techniques of this disclosure may reduce complexity of prediction by potentially simplifying an implementation of geometric partition mode (GPM). Geometric partition mode may refer to a partition mode configured to support splitting a block of video data into one or more shapes such as, for example, a triangle shape, a trapezoid shape or a rectangular shape. For example, a video coder (e.g., a video encoder or a video decoder) may split a block of video data into a first partition and a second partition, where the first partition comprises a triangular shape and the second partition comprises a trapezoidal shape. In contrast, when operating in triangle partition mode, the video coder may split a block of video data along a diagonal or anti-diagonal split that evenly splits a block into a first triangle partition and a second triangle partition.

Rather than relying on 32 angles of 11.25 degrees to select an angle of a split line, techniques described herein configure a video coder to apply a geometric partition mode that selects an angle for the split line from angles corresponding to an N:M ratio of samples of a current block, wherein N and M are integers. Additionally, the split line may not be at a corner of a block. The angles corresponding to an N:M ratio may permit the video coder to apply a geometric partition mode that supports angles for various block ratios (e.g., 1:1, 1:2, 1:4, 0:1, 2:1, and 1:0) that are computationally efficient. For example, the video coder may apply a geometric partition mode that supports angles that may be implemented by the video coder using bit-shifting rather than multiplication functions, which may potentially improve a computational efficiency of the video coder with little or no impact on coding accuracy compared to video coders configured to apply a geometric partition mode using 32 angles of 11.25 degrees.

In one example, a method of decoding video data includes determining that a geometric partition mode is enabled for a current block of the video data and determining a split line dividing the current block into a first partition and a second partition, wherein determining the split line comprises selecting an angle for the split line from a plurality of angles, each angle of the plurality of angles corresponding to an N:M ratio of samples of the current block, wherein N and M are integers, and wherein the split line is not at a corner of the current block. The method further includes determining geometric mode weights for the current block using the angle of the split line and generating a first prediction block using motion information for the first partition. The method further includes generating a second prediction block using motion information for the second partition and applying the geometric partition mode weights to samples of the first prediction block and to samples of the second prediction block to determine a final prediction block for the current block. The method further includes decoding a residual block for the current block and combining the final prediction block and the residual block to decode the current block.

In another example, a method of encoding video data includes determining that a geometric partition mode is enabled for a current block of the video data and determining a split line dividing the current block into a first partition and a second partition, wherein determining the split line comprises selecting an angle for the split line from a plurality of angles, each angle of the plurality of angles corresponding to an N:M ratio of samples of the current block, wherein N and M are integers, and wherein the split line is not at a corner of the current block. The method further includes determining geometric mode weights for the current block using the angle of the split line and generating a first prediction block using motion information for the first partition. The method further includes generating a second prediction block using motion information for the second partition and applying the geometric partition mode weights to samples of the first prediction block and to samples of the second prediction block to determine a final prediction block for the current block. The method further includes generating a residual block for the current block of video data based on differences between the current block of the video data and the final prediction block and encoding the residual block.

In one example, a device for decoding video data includes memory configured to store the video data and one or more processors implemented in circuitry and configured to determine that a geometric partition mode is enabled for a current block of the video data and determine a split line dividing the current block into a first partition and a second partition, wherein, to determine the split line, the one or more processors are configured to select an angle for the split line from a plurality of angles, each angle of the plurality of angles corresponding to an N:M ratio of samples of the current block, wherein N and M are integers, and wherein the split line is not at a corner of the current block. The one or more processors are further configured to determine geometric mode weights for the current block using the angle of the split line and generate a first prediction block using motion information for the first partition. The one or more processors are further configured to generate a second prediction block using motion information for the second partition and apply the geometric partition mode weights to samples of the first prediction block and to samples of the second prediction block to determine a final prediction block for the current block. The one or more processors are further configured to decode a residual block for the current block and combine the final prediction block and the residual block to decode the current block.

In another example, a device for encoding video data includes one or more processors implemented in circuitry and configured to determine that a geometric partition mode is enabled for a current block of the video data and determine a split line dividing the current block into a first partition and a second partition, wherein, to determine the split line, the one or more processors are configured to select an angle for the split line from a plurality of angles, each angle of the plurality of angles corresponding to an N:M ratio of samples of the current block, wherein N and M are integers, and wherein the split line is not at a corner of the current block. The one or more processors are further configured to determine geometric mode weights for the current block using the angle of the split line and generate a first prediction block using motion information for the first partition. The one or more processors are further configured to generate a second prediction block using motion information for the second partition and apply the geometric partition mode weights to samples of the first prediction block and to samples of the second prediction block to determine a final prediction block for the current block. The one or more processors are further configured to generate a residual block for the current block of video data based on differences between the current block of the video data and the final prediction block and encode the residual block.

In one example, a device for decoding video data includes means for determining that a geometric partition mode is enabled for a current block of the video data and means for determining a split line dividing the current block into a first partition and a second partition, wherein the means for determining the split line comprises means for selecting an angle for the split line from a plurality of angles, each angle of the plurality of angles corresponding to an N:M ratio of samples of the current block, wherein N and M are integers, and wherein the split line is not at a corner of the current block. The device further includes means for determining geometric mode weights for the current block using the angle of the split line and means for generating a first prediction block using motion information for the first partition. The device further includes means for generating a second prediction block using motion information for the second partition and means for applying the geometric partition mode weights to samples of the first prediction block and to samples of the second prediction block to determine a final prediction block for the current block. The device further includes means for decoding a residual block for the current block and means for combining the final prediction block and the residual block to decode the current block.

In another example, a device of encoding video data includes means for determining that a geometric partition mode is enabled for a current block of the video data and means for determining a split line dividing the current block into a first partition and a second partition, wherein the means for determining the split line comprises means for selecting an angle for the split line from a plurality of angles, each angle of the plurality of angles corresponding to an N:M ratio of samples of the current block, wherein N and M are integers, and wherein the split line is not at a corner of the current block. The device further includes means for determining geometric mode weights for the current block using the angle of the split line and means for generating a first prediction block using motion information for the first partition. The device further includes means for generating a second prediction block using motion information for the second partition and means for applying the geometric partition mode weights to samples of the first prediction block and to samples of the second prediction block to determine a final prediction block for the current block. The device further includes means for generating a residual block for the current block of video data based on differences between the current block of the video data and the final prediction block and means for encoding the residual block.

The details of one or more examples are set forth in the accompanying drawings and the description below. Other features, objects, and advantages will be apparent from the description, drawings, and claims.

BRIEF DESCRIPTION OF DRAWINGS

FIG. 7 is a conceptual diagram illustrating example uni-prediction MV selection for triangle partition mode.

FIG. 8 is a conceptual diagram illustrating example weights used in the blending process.

DETAILED DESCRIPTION

Figure 1:
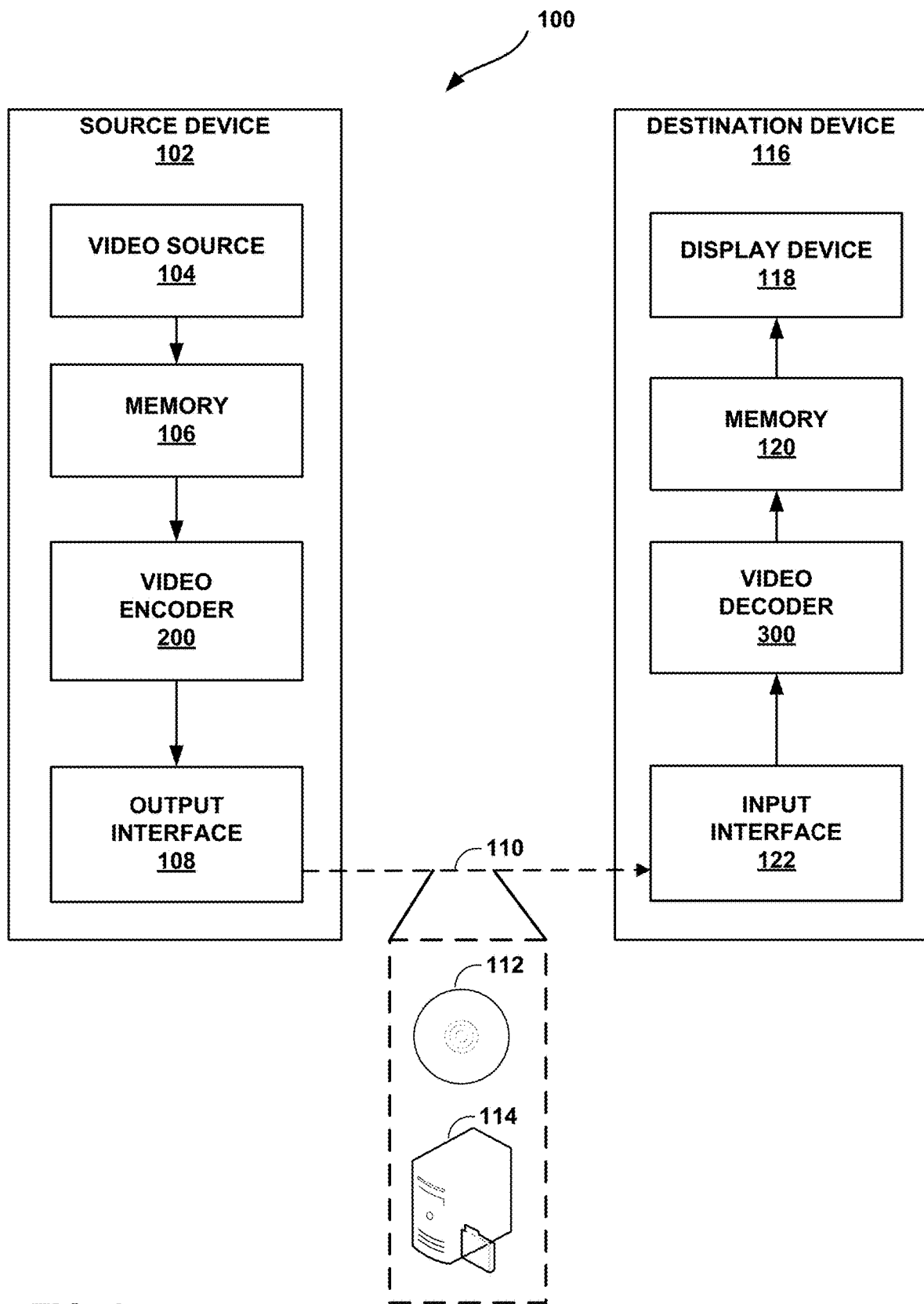
FIG. 1 is a block diagram illustrating an example video encoding and decoding system that may perform the techniques of this disclosure.

In general, this disclosure describes techniques for video coding. More specifically, the techniques of this disclosure are directed to partitioning for motion estimation, such as, for example, a triangular partition mode, a geometric partition mode (GPM), or another partition mode. For example, a video coder (e.g., a video encoder or a video decoder) may apply geometric partition mode to perform motion estimation to track a movement of a video object within the video data. In contrast, partitioning of video data frequently refers to a process where a video encoder divides a coding tree unit (CTU) along vertical or horizontal directions (see for example FIG. 2B) and signals information including a residual block for each block of video data.

For partitioning for motion estimation using triangular partition mode (TPM), a video coder (e.g., a video encoder or a video decoder) may apply a triangular partition mode to partition a rectangular block of video data into a first triangular partition and a second triangular partition. For example, the video coder may apply a split line from a first corner of the rectangular block (e.g., an upper-left corner or a lower-left corner) to a second corner of the rectangular block (e.g., a lower-right corner or an upper-right corner). The video coder may generate samples for a first prediction block using motion information for the first triangular partition and generate a second prediction block using motion information for the second triangular partition. In this example, the video coder may blend (e.g., weighted average) samples from the first prediction block and the second prediction block along the split line dividing the first triangular partition and the second triangular partition to generate a final prediction block for the block of the video data. In this example, a video encoder does not signal first residual information for the first triangular partition and second residual information for the second triangular partition. Instead, the video encoder may signal a single residual block for the entire block of video data. In this way, samples arranged in a portion of video data with similar motion may be grouped together, which may potentially improve a coding accuracy with little or no impact on computational complexity.

Generally, when operating in triangle partition mode, a video coder (e.g., a video encoder or video decoder) may split a block of video data along a diagonal or anti-diagonal split that evenly splits a block into a first partition and a second partition, where the first partition comprises a same number of samples as the second partition. While triangle partition mode may partition a square block along a 45 degree angle, the video coder may apply different triangle partition mode angles to non-square rectangular blocks. For example, the video coder may apply triangle partition mode to determine a first split line at a first triangle partition mode angle to evenly split a first block comprising a width:height ratio of 1:2, apply the triangle partition mode to determine a second split line at a second triangle partition mode angles to evenly split a second block comprising a width:height ratio of 1:4, and so on. That is, the set of triangle partition mode angles may include diagonal angles to accommodate each possible block ratio, such as, for example, 1:1, 1:2, 1:4, and 2:1. In some examples, the value for N or M of an N:M ratio of samples of a current block may be $2^X$, where X is 0 or positive integer.

Moreover, the set of triangle partition mode angles (also referred to herein as "TPM angles") may include anti-diagonal angles to accommodate each possible block ratio, such as, for example, 1:1, 1:2, 1:4, 2:1. The set of triangle partition mode angles may include a corresponding+180 degree angle for each of the diagonal angles and each of the anti-diagonal angles. For instance, for block ratios of 1:1, 1:2, 1:4, 2:1, the triangle set partition mode angles may include 4 diagonal angles, 4 diagonal angles with a 180 degree offset, 4 anti-diagonal angles, and 4 anti-diagonal angles with the 180 degree offset for a total of 16 angles.

The video coder may apply a geometric partition mode to split a block of video data into one or more triangular shapes and one or more a non-triangular shapes, such as, for example, a trapezoid shape or a rectangular shape. For example, a video coder (e.g., a video encoder or a video decoder) may generate a first prediction block using motion information for a first partition comprising a trapezoid shape and generate a second prediction block using motion information for a second partition the trapezoid shape. In this example, the video coder may apply the geometric partition mode weights to samples of the first prediction block and to samples of the second prediction block to determine a final prediction block for the current block. In some examples, a video coder (e.g., a video encoder or a video decoder) may apply geometric partition mode to split a block of video data into a first partition and a second partition, where the first partition comprises more samples than the second partition. In this way, the video coder may allow for the video coder to include additional samples with similar motion within a single partition, which may potentially improve a coding accuracy with little or no impact on computational complexity compared to systems video coders that rely on equal sized partitions and/or rectangular and triangular partitioning.

To perform geometric partition mode, some video coders may be configured to use 32 angles of 11.25 degrees to select an angle of a split line. For example, a video encoder may signal a value indicating a selection of one angle index from a set of 0-31. For example, an angle index of 0 may represent 0 degrees, an angle index of 1 may represent 11.25 degrees, an angle index of 2 may represent 22.5 degrees, and so on. Moreover, the video encoder may signal the value to indicate a line displacement relatively to a center of the block. Similarly, a video decoder may receive the value indicating the selection of one angle index from a set of 0-31 and the line displacement to determine a split line for the block. In this way, the video coder may apply a geometric partition mode to split a block of video data unevenly and/or to allow a splitting of the block of video data into a non-rectangular and a non-triangular shape, which may potentially improve a coding accuracy with little or no impact on computational complexity compared to systems video coders that rely on equal sized partitions and/or rectangular and triangular partitioning.

However, one or more problems may exist with configuring a video coder (e.g., a video encoder or a video decoder) to use 32 angles of 11.25 degrees to select an angle of a split line. For example, the 32 angles of 11.25 degrees may result in the video coder using multiplication functions to multiply a sample position times a cosine of the angle, which may be computationally extensive causing delays in the coding. Techniques described herein may represent one or more solutions to the problems existing with using 32 angles of 11.25 degrees to select an angle of a split line. For example, a set of angles for applicable to triangular partitioning may, instead, be applied to geometric partition mode such that the geometric partitioning mode may include a set of different angles.

For example, the set of angles used for geometric mode partitioning may include triangle set partition mode angles corresponding to an N:M ratio, where N and M are integers, For example, the set of angles used for geometric mode partitioning may include triangle set partition mode angles corresponding to 1:1, 1:2, 1:4, and 2:1. More specifically, the set of angles used for geometric mode partitioning may include a set of 4 diagonal angles, 4 diagonal angles with a 180 degree offset, 4 anti-diagonal angles, and 4 anti-diagonal angles with the 180 degree offset. Moreover, the video coder may determine the set of angles used for geometric mode partitioning may further include angles to support a splitting of a block into a rectangular shape. For example, the set of angles used for geometric mode partitioning may further include one or more horizontal angles and/or one or more vertical angles. Moreover, in contrast with TPM, GPM allows for a split line to be displaced from a corners of a current block. For example, when applying GPM with triangle set partition mode angles, a video coder (e.g., video encoder or video decoder) may determine a split line dividing the current block into a first partition and a second partition is not at a corner of the current block. For instance, the video coder may determine the split line is arranged such that one or more of the first partition or the second partition comprise a non-triangular shape (e.g., trapezoidal).

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110.

Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for Geometric Partition Mode with Harmonized Motion Field Storage and Motion Compensation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for Geometric Partition Mode with Harmonized Motion Field Storage and Motion Compensation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-02001-vE (hereinafter "VVC Draft 6"). A more recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 19th Meeting: by teleconference, 22 Jun. 1-Jul. 2020, JVET-S2001-vG (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 may apply geometric partition mode to generate a first partition of the current block of video data and a second partition of the block of video data. In general, video encoder 200 may select a split line comprising an angle and a displacement (e.g., a horizontal displacement from a center of the current block, a vertical displacement from the center of the current block, or a displacement from the center of the current block). The video encoder 200 may signal an indication (e.g., an index) of the split line.

Video encoder 200 may generate a first prediction block using first motion information for the first partition and generate a second prediction block using second motion information for the second partition. Video encoder 200 may determine geometric mode weights to apply to the first and second prediction blocks using the angle of the split line. For example, video encoder 200 may apply a weight map that applies a weight to values of the current block consistent with the weights illustrated in the example of FIG. 8 relative to the split line. Video encoder 200 may determine a final prediction block using the geometric partition mode weights. For example, video encoder 200 may apply a respective geometric partition mode weight to each co-located sample of the first prediction block and the second prediction block to determine a value for a sample of the final prediction block.

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

Video decoder 300 may receive an indication (e.g., an index) of the split line. Video decoder 300 may apply geometric partition mode to generate a first partition of the current block of video data and a second partition of the block of video data using the split line. In general, video decoder 300 may determine a split line comprising an angle and a displacement (e.g., a horizontal displacement from a center of the current block, a vertical displacement from the center of the current block, or a displacement from the center of the current block).

Video decoder 300 may generate a first prediction block using first motion information for the first partition and generate a second prediction block using second motion information for the second partition. Video decoder 300 may determine geometric mode weights to apply to the first and second prediction blocks for the current block using the angle of the split line. For example, video decoder 300 may apply a weight map that applies a weight to values of the current block consistent with the weights illustrated in the example of FIG. 8 relative to the split line. Video decoder 300 may determine a final prediction block using the geometric partition mode weights. For example, video decoder 300 may apply a respective geometric partition mode weight to each co-located sample of the first prediction block and the second prediction to determine a value for a sample of the final prediction block.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video decoder 300 may be configured to determine that a geometric partition mode is enabled for a current block of the video data and determine a split line dividing the current block into a first partition and a second partition, wherein, to determine the split line, video decoder 300 is configured to select an angle for the split line from a plurality of angles, each angle of the plurality of angles corresponding to an N:M ratio, wherein N and M are integers, and wherein the split line is not at a corner of the current block. Video decoder 300 is further configured to determine geometric mode weights for the current block using the angle of the split line and generate a first prediction block using motion information for the first partition. Video decoder 300 is further configured to generate a second prediction block using motion information for the second partition and apply the geometric partition mode weights to samples of the first prediction block and to samples of the second prediction block to determine a final prediction block for the current block. Video decoder 300 is further configured to decode a residual block for the current block and combine the final prediction block and the residual block to decode the current block.

In some examples, video decoder 300 may be configured to determine that a geometric partition mode is enabled for a current block of the video data and determine a split line dividing the current block into a first partition and a second partition, wherein, to determine the split line, video decoder 300 is configured to select an angle for the split line from a plurality of angles, each angle of the plurality of angles corresponding to an N:M ratio, wherein N and M are integers, and wherein the split line is not at a corner of the current block. Video decoder 300 is further configured to determine geometric mode weights for the current block using the angle of the split line and generate a first prediction block using motion information for the first partition. Video decoder 300 is further configured to generate a second partition block partition using motion information for the second partition and apply the geometric partition mode weights to samples of the first prediction block and to samples of the second prediction block to determine a final prediction block for the current block. Video decoder 300 is further configured to generate a residual block for the current block of video data based on differences between the current block of the video data and the prediction block and encode the residual block This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
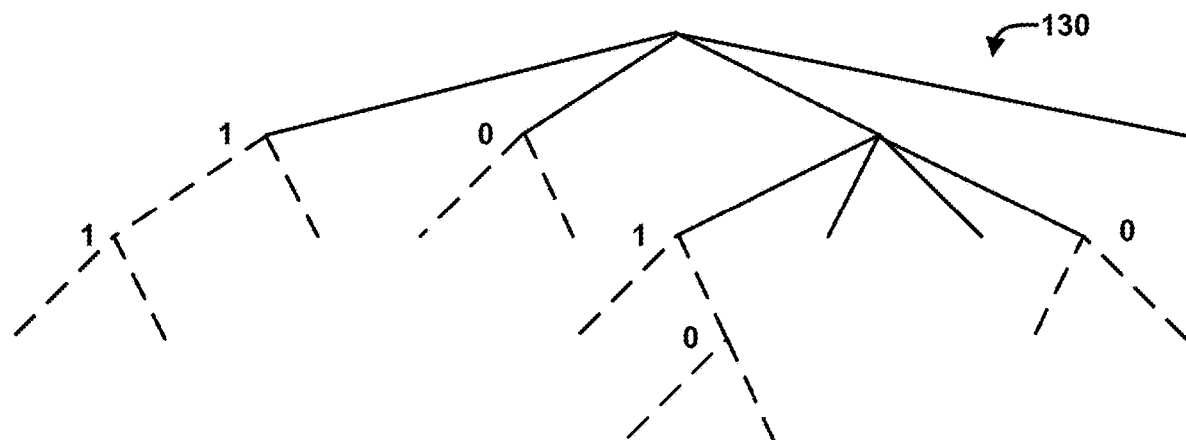
FIGS. 2A and 2B are conceptual diagrams illustrating an example quadtree binary tree (QTBT) structure, and a corresponding coding tree unit (CTU).
Figure 2B:
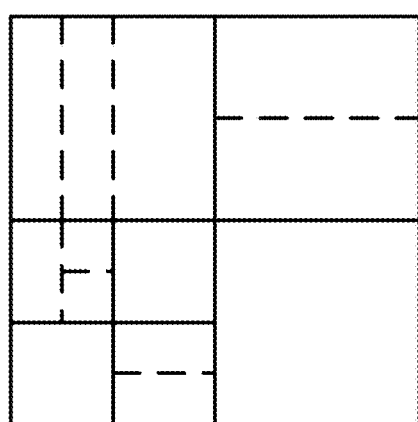

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

Figure 3:
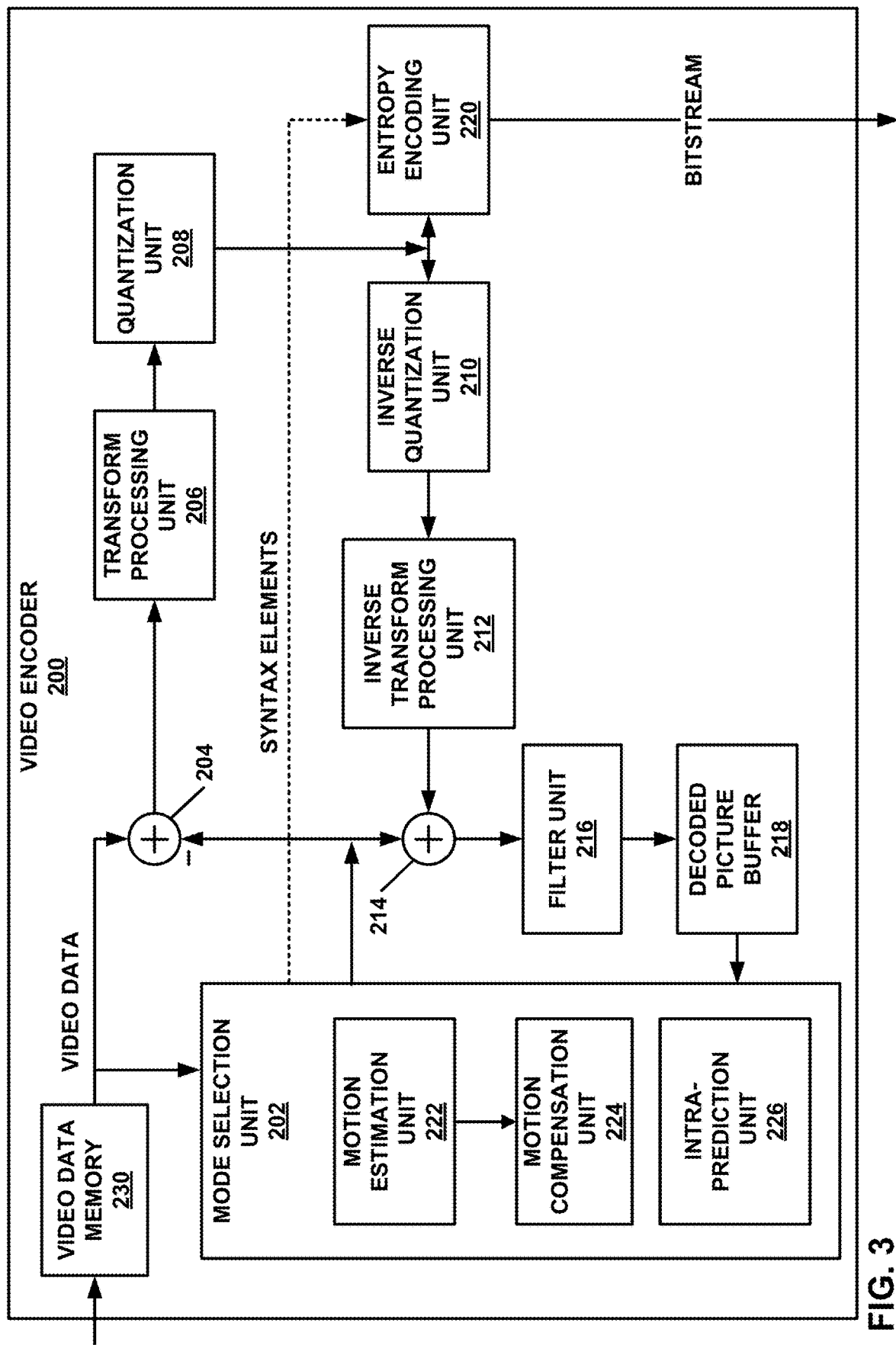
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. In some examples, motion compensation unit 224 may form a prediction block using techniques described herein for geometric partition mode with harmonized motion field storage and motion compensation. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 may apply geometric partition mode to generate a first partition of the current block of video data and a second partition of the block of video data. In general, node selection unit 202 may select a split line comprising an angle and a displacement (e.g., a horizontal displacement from a center of the current block, a vertical displacement from the center of the current block, or a displacement from the center of the current block). Mode selection unit 202 may cause entropy encoding unit 220 to signal an indication (e.g., an index) of the split line.

Mode selection unit 202 may generate the first partition using first motion information for the first partition and generate the second partition using second motion information for the second partition. Mode selection unit 202 may determine geometric mode weights for the current block using the angle of the split line. For example, mode selection unit 202 may apply a weight map that applies a weight to values of the current block consistent with the weights illustrated in the example of FIG. 8 relative to the split line. Mode selection unit 202 may determine a final prediction block using the geometric partition mode weights. For example, mode selection unit 202 may apply a respective geometric partition mode weight to each co-located sample of the first prediction block and the second prediction block to determine a final value for a sample of a final prediction block for the current block.

Mode selection unit 202 provides the prediction block to residual generation unit 204. Residual generation unit 204 receives a raw, unencoded version of the current block from video data memory 230 and the final prediction block from mode selection unit 202. Residual generation unit 204 calculates sample-by-sample differences between the current block and the final prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that a geometric partition mode is enabled for a current block of the video data and determine a split line dividing the current block into a first partition and a second partition, wherein, to determine the split line, video encoder 200 is configured to select an angle for the split line from a plurality of angles, each angle of the plurality of angles corresponding to an N:M ratio of samples of the current block, wherein N and M are integers, and wherein the split line is not at a corner of the current block. Video encoder 200 is further configured to determine geometric mode weights for the current block using the angle of the split line and generate a first prediction block using motion information for the first partition. Video encoder 200 is further configured to generate a second prediction block using motion information for the second partition and apply the geometric partition mode weights to samples of the first prediction block and to samples of the second prediction block to determine a final prediction block for the current block. Video encoder 200 is further configured to generate a residual block for the current block of video data based on differences between the current block of the video data and the final prediction block and encode the residual block.

Figure 4:
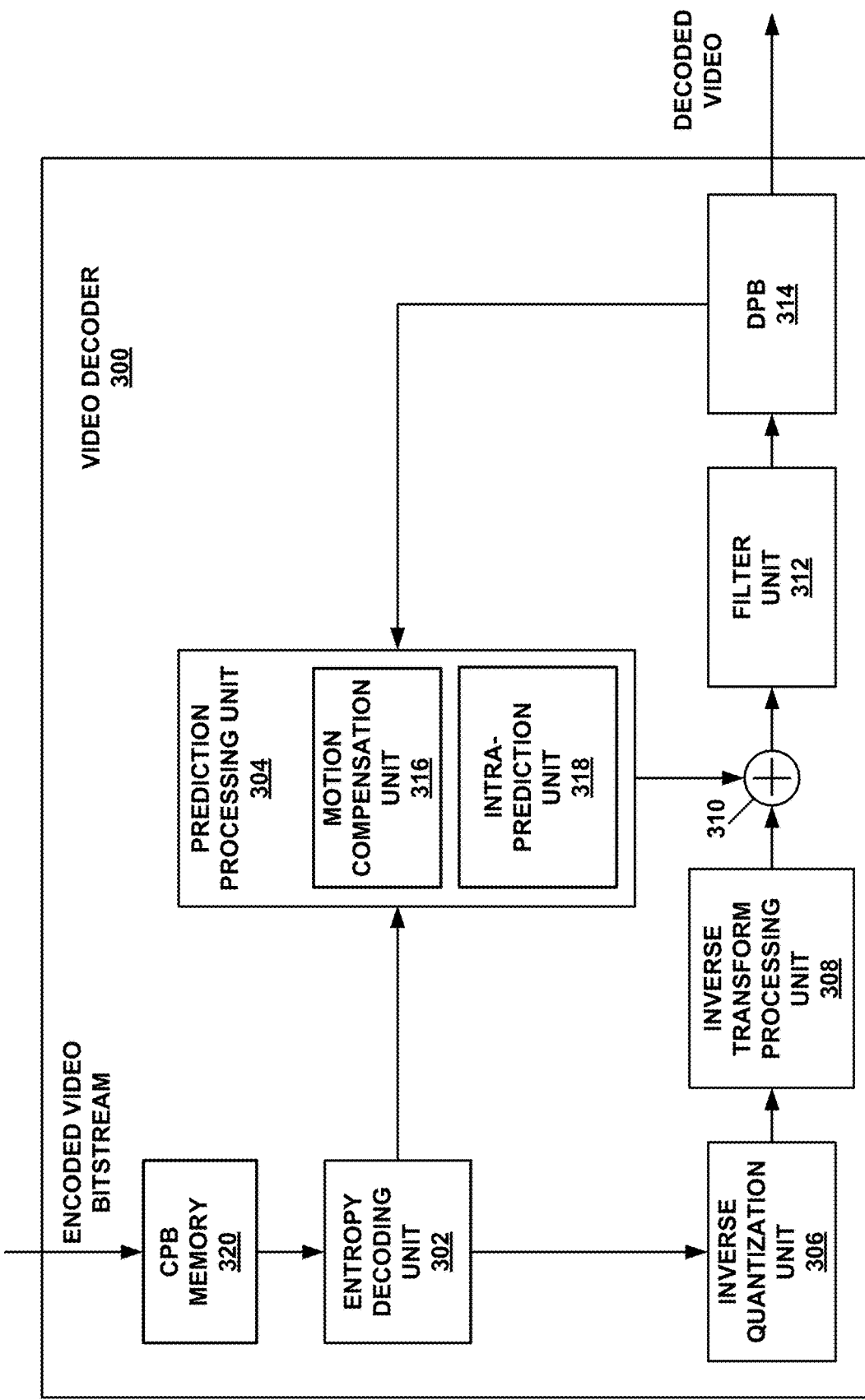
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3). In some examples, motion compensation unit 316 may form a prediction block using techniques described herein for geometric partition mode with harmonized motion field storage and motion compensation.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Prediction processing unit 304 may receive an indication (e.g., an index) of the split line. Prediction processing unit 304 may apply geometric partition mode to generate a first partition of the current block of video data and a second partition of the block of video data using the split line. In general, prediction processing unit 304 may determine an split line comprising an angle and a displacement (e.g., a horizontal displacement from a center of the current block, a vertical displacement from the center of the current block, or a displacement from the center of the current block).

Prediction processing unit 304 may generate a first prediction block using motion information for the first partition determined using first motion information for the first partition and generate a second prediction block using motion information for the second partition using second motion information for the second partition. Prediction processing unit 304 may determine geometric mode weights for the current block using the angle of the split line. For example, prediction processing unit 304 may apply a weight map that applies a weight to values of the current block consistent with the weights illustrated in the example of FIG. 8 relative to the split line. Prediction processing unit 304 may determine a final prediction block using the geometric partition mode weights. For example, prediction processing unit 304 may apply a respective geometric partition mode weight to each co-located sample of the first prediction block and the second prediction to determine a value for a sample of a final prediction block for the current block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to determine that a geometric partition mode is enabled for a current block of the video data and determine a split line dividing the current block into a first partition and a second partition, wherein, to determine the split line, video decoder 300 is configured to select an angle for the split line from a plurality of angles, each angle of the plurality of angles corresponding to an N:M ratio of samples of the current block, wherein N and M are integers, and wherein the split line is not at a corner of the current block. Video decoder 300 is further configured to determine geometric mode weights for the current block using the angle of the split line and generate a first prediction block using motion information for the first partition. Video decoder 300 is further configured to generate a second prediction block using motion information for the second partition and apply the geometric partition mode weights to samples of the first prediction block and to samples of the second prediction block to determine a final prediction block for the current block. Video decoder 300 is further configured to decode a residual block for the current block and combine the final prediction block and the residual block to decode the current block.

In this section video coding standards, especially GPM storage related techniques of previous standards are described. Video coding standards may include, for example, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a newly developed video coding standard, namely, for example, but not limited to, High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A draft of HEVC is available from http://phenix.int-evry.fr/jct/doc_end user/documents/12 Geneva/wg11/JCTVC-L1003-v34.zip. The specification text of Versatile Video Coding and Test Model 6 (VTM 6) could be referred to JVET-O2001.

Figure 5:
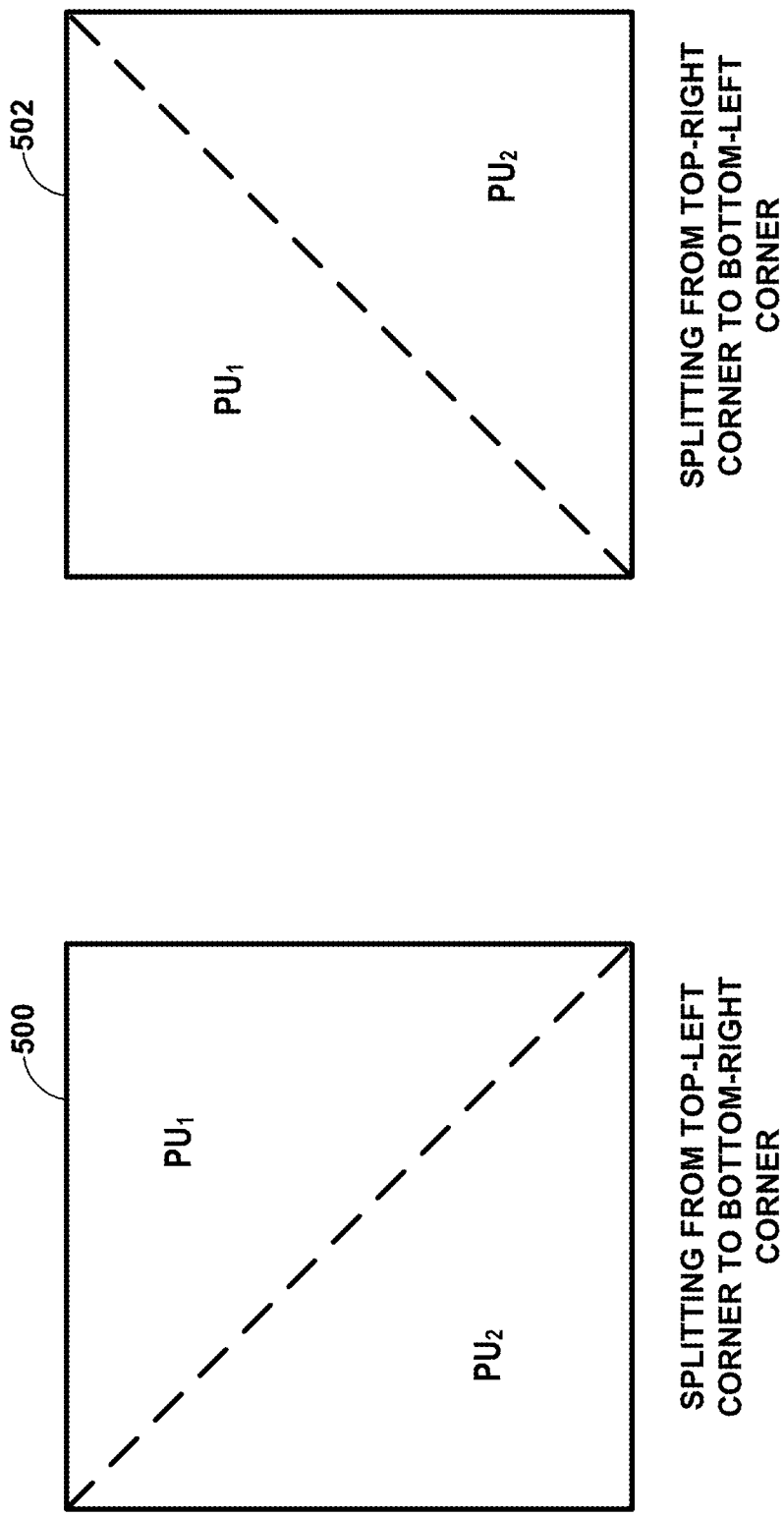
FIG. 5 is a conceptual diagram illustrating example triangle partition based inter prediction.

FIG. 5 is a conceptual diagram illustrating example triangle partition based inter prediction. As introduced in Chen, et al. "Algorithm description for Versatile Video Coding and Test Model 5 (VTM 5)," Joint Video Experts Team (WET) of ITU-T SG 16 WP 3 and ISO/IEC JTC 1/SC 29/WG 11, 14th Meeting: Geneva, CH, 19-27 Mar. 2019, JVET-N1002-v2 (hereinafter "WET-N1002,"), a video coder (e.g., video encoder 200 and video decoder 300) may apply the triangle partition mode only to CUs coded in skip or merge mode, but not in Merge with Motion Vector Differences (MMVD) or Combined inter and intra prediction (CIIP) mode. For a CU satisfying those conditions (e.g., CUs coded in skip or merge mode, but not in MMVD or CIIP mode), video encoder 200 may signal a flag to indicate whether the triangle partition mode is applied or not.

When a triangle partition mode is used, video encoder 200 and video decoder 300 may be configured to split the CU evenly into two triangle shaped partitions, using either the diagonal split of block 500 or the anti-diagonal split of block 502. As shown, the resulting split line is arranged in corners of block 500. Video encoder 200 and video decoder 300 may be configured to inter-predict each triangle partition in the CU using each triangle's own motion; only uni-prediction is allowed for each partition, that is, each partition has one motion vector and one reference index. Video encoder 200 and video decoder 300 may be configured to apply the uni-prediction motion constraint to ensure only two motion compensated prediction are needed for each CU, which is the same as bi-prediction of a CU.

Figure 6:
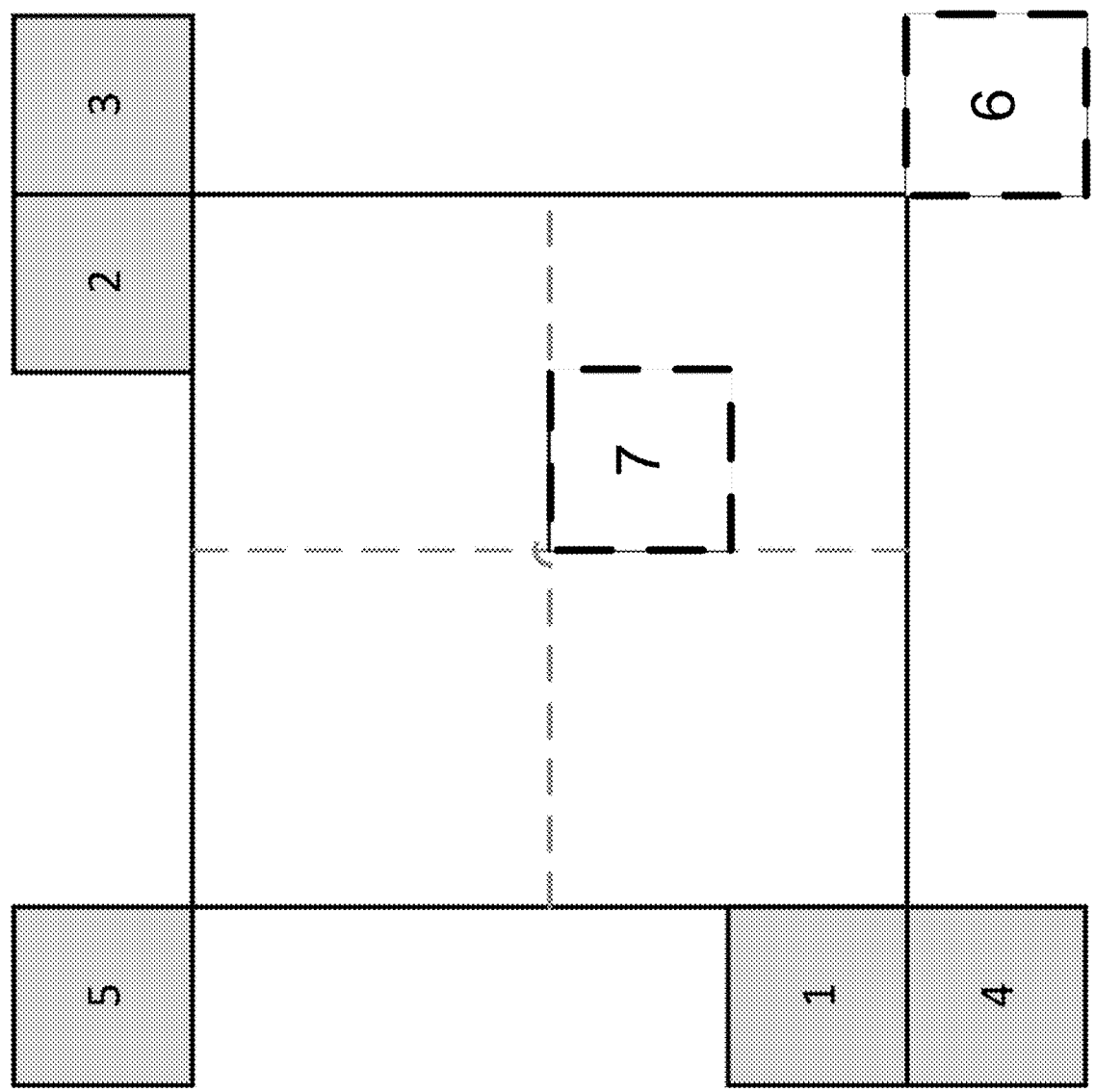
FIG. 6 is a conceptual diagram illustrating example spatial and temporal neighboring blocks used to construct the uni-prediction candidate list.

Video encoder 200 and video decoder 300 may be configured to derive the uni-prediction motion for each partition from a uni-prediction candidate list constructed using uni-prediction candidate list construction (see FIG. 6). In the example of FIG. 6, the CU-level flag indicates that the current CU is coded using the triangle partition mode. If triangle partition mode is used, video encoder 200 may be configured to signal a flag indicating the direction of the triangle partition (e.g., diagonal or anti-diagonal), and two merge indices (e.g., one for each triangle partition). After predicting each of the triangle partitions, video encoder 200 and video decoder 300 may be configured to adjust the sample values along the diagonal or anti-diagonal edge using a blending processing with adaptive weights. This is the prediction signal for the whole CU and transform and video encoder 200 and video decoder 300 may be configured to apply a quantization process to the whole CU as in other prediction modes. Finally, video encoder 200 and video decoder 300 may be configured to store the motion field of a CU predicted using the triangle partition mode in 4×4 units using blending along a triangle partition edge (see FIG. 8).

FIG. 6 is a conceptual diagram illustrating example spatial and temporal neighboring blocks used to construct the uni-prediction candidate list. The uni-prediction candidate list may include or consist of five uni-prediction motion vector candidates. Video encoder 200 and video decoder 300 may be configured to derive the uni-prediction candidate list from seven neighboring blocks including five spatial neighboring blocks (labeled 1 to 5 in FIG. 6) and two temporal co-located blocks (labeled 6 to 7 in FIG. 6). Video encoder 200 and video decoder 300 may be configured to collect the motion vectors of the seven neighboring blocks and put the motion vectors of the seven neighboring blocks into the uni-prediction candidate list according to the following order: first, the motion vectors of the uni-predicted neighboring blocks; then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. If the number of candidates is less than five, video encoder 200 and video decoder 300 may be configured to add a zero motion vector to the end of the list.

Figure 7:
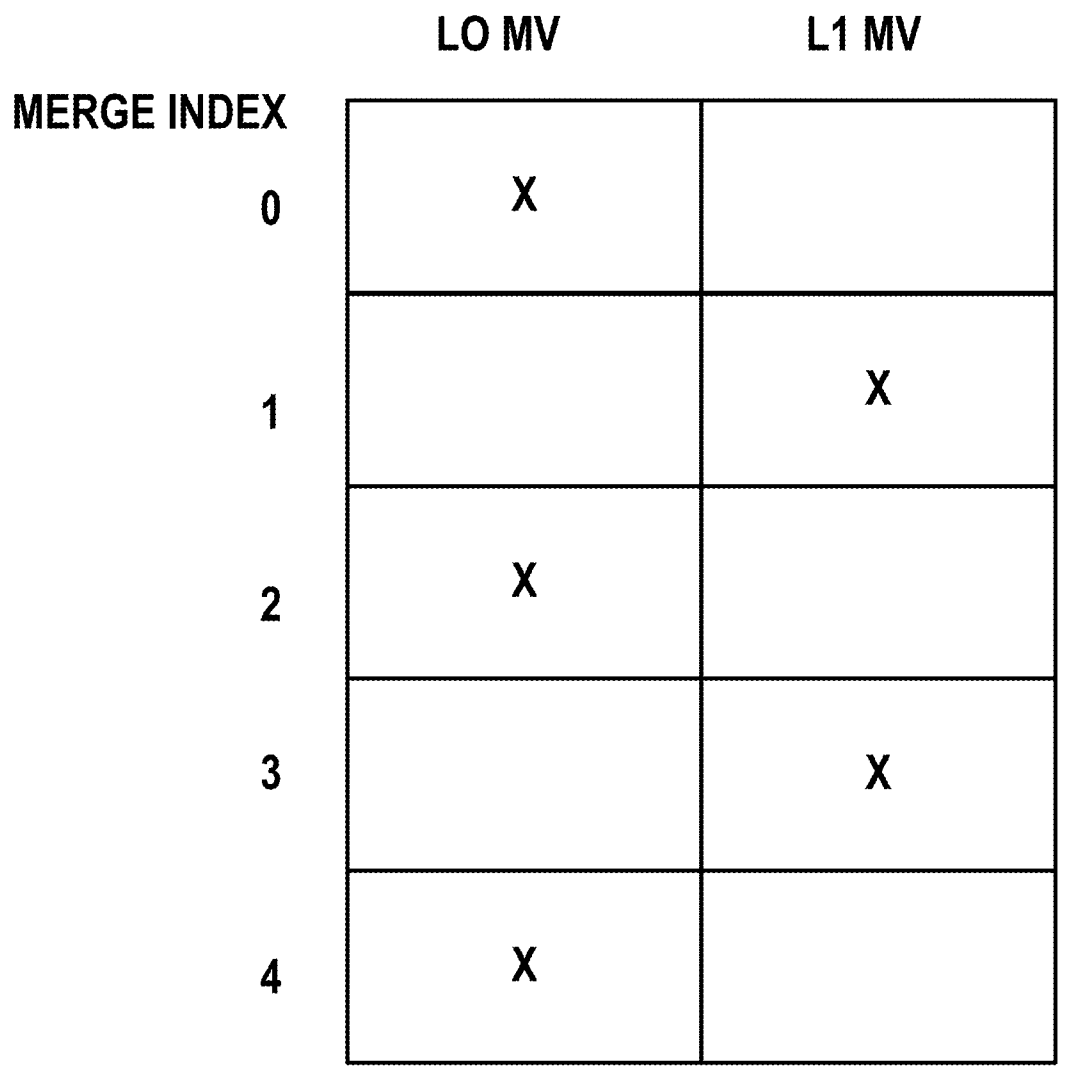

FIG. 7 is a conceptual diagram illustrating example uni-prediction MV selection for triangle partition mode. The following describes triangle partition mode (TPM) candidate list construction. Given a merge candidate index, video encoder 200 and video decoder 300 may be configured to derive the uni-prediction motion vector from the merge candidate list. For a candidate in the merge list, video encoder 200 and video decoder 300 may be configured to use the candidate's LX MV (with X equal to the parity of the merge candidate index value) as the uni-prediction motion vector for triangle partition mode. These motion vectors are marked with "x" in FIG. 7. In case a corresponding LX motion vector does not exist, video encoder 200 and video decoder 300 may be configured to use the L(1−X) motion vector of the same candidate in the extended merge prediction candidate list as the uni-prediction motion vector for triangle partition mode. For example, supposing the merge list is composed of 5 sets of bi-prediction motions, video encoder 200 and video decoder 300 may be configured to compose the TPM candidate list of, from the first to the last, L0/L1/L0/L1/L0 MV of 0th/1st/2nd/3rd/4th merge candidate. Then, video encoder 200 and video decoder 300 may be configured to use signals from two different merge indices for the TPM mode, one for each triangle partition, to indicate the use of candidates in the TPM candidate list.

Figure 8:
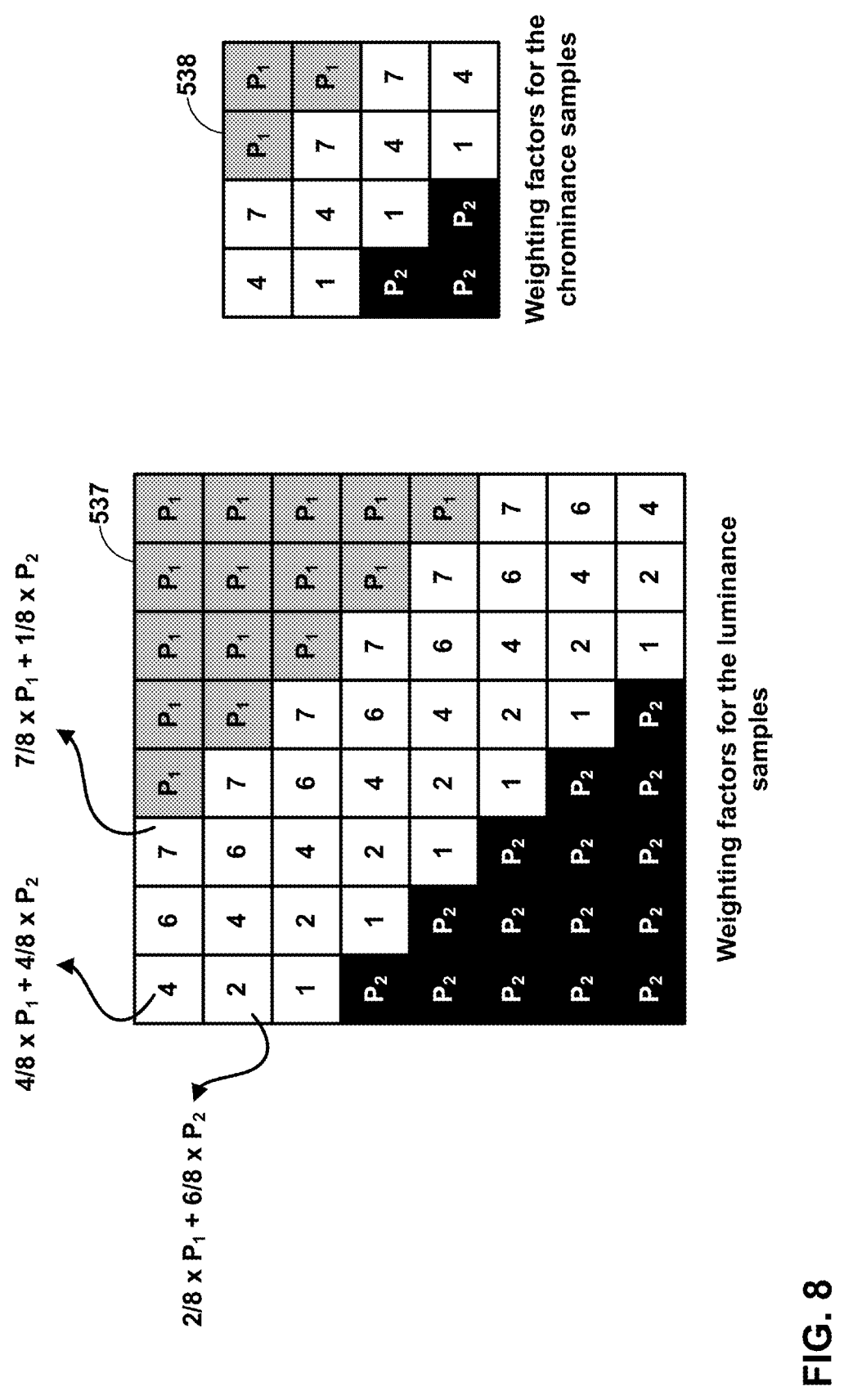

FIG. 8 is a conceptual diagram illustrating example weights used in the blending process. The example blending process of FIG. 8 may be referred to herein as section 2.2.3 blending along the triangle partition edge, or simply section 2.2.3.

A video coder (e.g., video encoder 200 and/or video decoder 300) may be configured to perform the example pixel blending of FIG. 8 with one set of weights as shown in FIG. 8. The video coder may be configured to generate the pixels in blending areas by, for example, weighted averaging of the collocated motion compensated pixels based on motion information of the two triangular partitions. As used herein, collocated pixels may refer to a first pixel of a first prediction block determined using a first partition (e.g., a first triangle-shaped partition) that is positioned at a same pixel position as a second pixel of a second prediction block determined using a second partition (e.g., a second triangle-shaped partition).

That is, for example, a video coder (e.g., video encoder 200 or video decoder 300) may apply pixel blending using a set of weights to generate a final prediction block for the chroma components of the block of video data. In this example, to apply pixel blending, the video coder may determine weighted averages, using the set of weights, of collocated motion compensated pixels (shown as "$P_1$") of a first partition block determined using motion information for a first triangle-shaped partition and collocated motion compensated pixels (shown as "$P_2$") of a second partition block determined using motion information for a second triangle-shaped partition.

For example, a video coder (e.g., video encoder 200 or video decoder 300) may be configured to determine motion information for the first triangle-shaped partition by performing a motion search to identify a reference block that closely matches the first triangle-shaped partition, e.g., in terms of differences between the first triangle-shaped partition and a reference block. In some examples, the video coder may calculate a difference metric using a sum of absolute difference (SAD), sum of squared differences (SSD), mean absolute difference (MAD), mean squared differences (MSD), or other such difference calculations to determine whether a reference block closely matches the first triangle-shaped partition. In some examples, the video coder may predict a first prediction block using uni-directional prediction or bi-directional prediction. Pixels of the first prediction block may be referred to herein as "$P_1$" and may also be referred to herein as samples of the first prediction block.

Similarly, a video coder (e.g., video encoder 200 or video decoder 300) may be configured to determine motion information for the second triangle-shaped partition by performing a motion search to identify a reference block that closely matches the second triangle-shaped partition, e.g., in terms of differences between the first triangle-shaped partition and a reference block. In some examples, the video coder may calculate a difference metric using a sum of absolute difference (SAD), sum of squared differences (SSD), mean absolute difference (MAD), mean squared differences (MSD), or other such difference calculations to determine whether a reference block closely matches the second triangle-shaped partition. In some examples, the video coder may predict a second prediction block using uni-directional prediction or bi-directional prediction. Pixels of the second prediction block may be referred to herein as "$P_2$" and may also be referred to herein as samples of the second prediction block.

As shown in FIG. 8, a video coder (e.g., video encoder 200 or video decoder 300) may determine a pixel value P for pixels marked with "2" of prediction block 537 (also referred to herein as "final prediction block 537") for luma components and/or prediction block 538 "final prediction block 538") for luma components by calculating the respective value P for each pixel according to EQUATION 1.

$$P = 2/8 * P_1 + 6/8 * P_2 \quad \text{EQUATION 1}$$

where $P_1$ is a first reference pixel value of a first pixel of the first prediction block that is collocated with the respective pixel marked with "2" in this example and where $P_2$ is a second reference pixel value of a second pixel of the second prediction block that is collocated with the respective pixel marked with "2" in this example.

In the example of FIG. 8, a video coder (e.g., video encoder 200 or video decoder 300) may determine a pixel value P for pixels marked with "4" of prediction block 537 for luma components and/or prediction block 538 for luma components by calculating the respective value P for each pixel according to EQUATION 2.

$$P = 4/8 * P_1 + 4/8 * P_2 \quad \text{EQUATION 2}$$

where $P_1$ is a first reference pixel value of a first pixel of the first prediction block that is collocated with the respective pixel marked with "4" in this example and where $P_2$ is a second reference pixel value of a second pixel of the second prediction block that is collocated with the respective pixel marked with "4" in this example.

In the example of FIG. 8, a video coder (e.g., video encoder 200 or video decoder 300) may determine a pixel value P for pixels marked with "7" of prediction block 537 for luma components and/or prediction block 538 for luma components by calculating the respective value P for each pixel according to EQUATION 3.

$$P = 7/8 * P_1 + 1/8 * P_2 \quad \text{EQUATION 3}$$

where $P_1$ is a first reference pixel value of a first pixel of the first prediction block that is collocated with the respective pixel marked with "7" in this example and where $P_2$ is a second reference pixel value of a second pixel of the second prediction block that is collocated with the respective pixel marked with "7" in this example.

The values "1" and "6" represent equations corresponding to EQUATIONS 1-3. That is, a video coder (e.g., video encoder 200 or video decoder 300) may determine a pixel value P for pixels marked with "1" of prediction block 537 for luma components and/or prediction block 538 for luma components by calculating the respective value P for each pixel according to EQUATION 4.

$$P = \frac{1}{8} * P_1 + \frac{7}{8} * P_2 \qquad \text{EQUATION 4}$$

where $P_1$ is a first reference pixel value of a first pixel of the first prediction block and where $P_2$ is a second reference pixel value of a second pixel of the second prediction block.

A video coder (e.g., video encoder 200 or video decoder 300) may determine a pixel value P for pixels marked with "6" of prediction block 537 for luma components and/or prediction block 538 for luma components by calculating the respective value P for each pixel according to EQUATION 5.

$$P = \frac{6}{8} * P_1 + \frac{2}{8} * P_2 \qquad \text{EQUATION 5}$$

where $P_1$ is a first reference pixel value of a first pixel of the first prediction block and where $P_2$ is a second reference pixel value of a second pixel of the second prediction block.

While the example illustrated in FIG. 8 shows an example set of weights {⅞, ⅝, ⁴⁄₈, ⅜, ⅛} for luma and {⅞, ⁴⁄₈, ⅛} for chroma, other examples may use different weights. For example, there may be two sets of weights and in each set chroma weights and luma weights may be defined separately:

1ˢᵗ set: {⅞, ⅝, ⁴⁄₈, ⅜, ⅛} for luma and {⅞, ⁴⁄₈, ⅛} for chroma.
2ⁿᵈ set: {⅞, ⅝, ⅝, ⁴⁄₈, ⅜, ⅜, ⅛} for luma and {⅝, ⁴⁄₈, ⅜} for chroma.

The example motion field process described in the following may be referred to herein as section 2.2.4 motion field storage, or simply section 2.2.4. Video encoder 200 and video decoder 300 may be configured to store the motion vectors of a CU coded in triangle partition mode in 4×4 units. Depending on the position of each 4×4 unit, video encoder 200 and video decoder 300 may be configured to store either uni-prediction or bi-prediction motion vectors. In this example, Mv1 and Mv2 may represent uni-prediction motion vectors for partition 1 and partition 2, respectively. Partition 1 and 2 may be the triangle blocks sitting respectively on the upper-right corner and lower-left corner when CUs may be partitioned from top-left to lower-right (that is 45° split), while Mv1 and Mv2 become triangle blocks sitting respectively on the upper-left corner and lower-right corner when CUs are partitioned from top-right to lower-left (that is 135° split). If a 4×4 unit is located in the non-weighted area shown in the example of FIG. 9, video encoder 200 and video decoder 300 may be configured to store either Mv1 or Mv2 for that 4×4 unit. Otherwise, if the 4×4 unit is located in the weighted area, video encoder 200 and video decoder 300 may be configured to store a bi-prediction motion vector. Video encoder 200 and video decoder 300 may be configured to derive the bi-prediction motion vector from Mv1 and Mv2 according to the following process:

1. If Mv1 and Mv2 are from different reference picture lists (one from L0 and the other from L1), video encoder 200 and video decoder 300 may be configured to combine Mv1 and Mv2 to form the bi-prediction motion vector.
2. Otherwise, if Mv1 and Mv2 are from the same list, video encoder 200 and video decoder 300 may be configured to store only Mv2.

Figure 9:
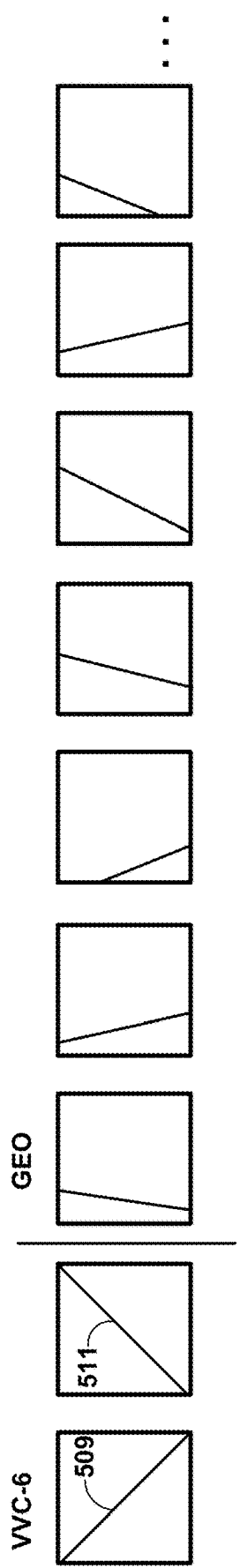
FIG. 9 is a conceptual diagram illustrating example triangle partition mode (TPM).

FIG. 9 is a conceptual diagram illustrating example triangle partition mode (TPM). As shown, when applying triangle partition mode, a video coder (e.g., video encoder 200 or video decoder 300) may apply a diagonal split line 509 or anti-diagonal split line 511. As shown, diagonal split line 590 and anti-diagonal split line 511 are arranged at corners of a current block. Additionally, when apply geometric partition mode, the video coder may apply split lines at quantized angle between 0 and 360 degrees, with 11.25 degrees of separation and separation line displacement relatively to the center of the block.

FIG. 9 illustrates an example of TPM as in VVC Draft and GPM as in Esenlik, et al. "Non-CE4: Geometrical partitioning for inter blocks Joint Video Experts Team (JVET) of ITU-T SG 16 WP 3 and ISO/IEC JTC 1/SC 29/WG 11, 15ᵗʰ Meeting: Gothenburg, SE, 3-12 Jul. 2019, JVET-O0489-v4 (hereinafter "JVET-6 O0489").

Geometric partitioning was introduced in JVET-O0489 as a proposed extension to the non-rectangular partitioning introduced by TPM. As introduced in JVET-O0489, a video encoder or video decoder may apply the geometric partition mode (GEO) only to CUs coded in skip or merge mode, but not in MMVD or CIIP mode. For a CU satisfying those conditions, a video encoder (e.g., video encoder 200) may signal a flag to indicate whether GPM is applied or not. FIG. 9 illustrates TPM in VVC Draft 6 and additional shapes proposed for non-rectangular inter blocks.

Overall number of GPM partitioning may be 140 possibilities. Additional signaling for GPM signals the angle α, and separation line displacement relatively to the center of the block ρ. α represents a quantized angle between 0 and 360 degrees, with 11.25 degrees of separation and p represents a distance with 5 different values. Video encoder 200 and video decoder 300 may be configured to store the values a and p pairs in a table of size 140×(3+5)/8=140 bytes. That is, video encoder 200 may signal a value indicating an angle index. Video decoder 300 may receive a value indicating an angle index and determine the angle for the split line using the value indicating the angle index. Similarly, video encoder 200 may determine a distance offset from a center of the current block. Video encoder 200 may signal the value indicating the offset index.

Figure 10:
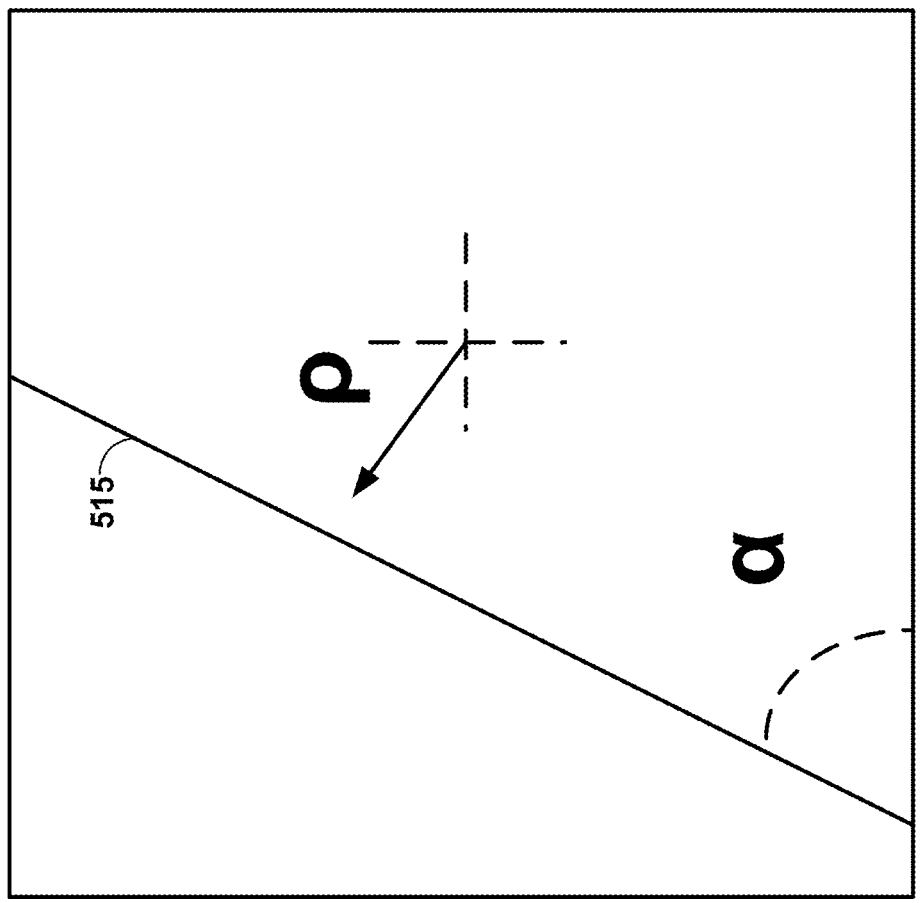
FIG. 10 is a conceptual diagram illustrating example geometric partition mode partitioning signaling.

FIG. 10 is a conceptual diagram illustrating example GPM partitioning signaling. In the example of FIG. 10, video encoder 200 may signal values for angle and separation line displacement relatively to the center of the block p for split line 515.

Similarly to TPM, video encoder 200 and video decoder 300 may be configured to allow GPM partitioning for inter for uni-predicted blocks not smaller than 8×8 in order to have the same memory bandwidth with bi-predicted blocks at decoder side. Motion vector prediction for GPM partitioning may be aligned with TPM. As well as in TPM, video encoder 200 and video decoder 300 may be configured to apply blending between two predictions on an inner boundary.

According to the process proposed in JVET-O0489, a video encoder may signal the GPM mode as an additional merge mode.

TABLE 1

Syntax elements introduced by JVET-O0489 if (cbWidth >= 8 && cbHeight >= 8 ){
    geo_flag[ x0 ][ y0 ]
}

TABLE 1-continued

Syntax elements introduced by JVET-O0489

```
if (geo_flag[ x0 ][ y0 ]) {
    geo_partition_idx[ x0 ][ y0 ]
    geo_merge_idx0[ x0 ][ y0 ]
    geo_merge_idx1[ x0 ][ y0 ]
}
```

The geo_merge_idx0 and geo_merge_idx1 are coded using same CABAC contexts and binarization as TPM merge indices. The geo_partition_idx indicates the partition mode (out of 140 possibilities) and is coded using truncated binary binarization and bypass coding.

When GPM mode is not selected, video encoder 200 and video decoder 300 may be configured to select the TPM. The partitions of the GPM mode do not include partitions that can be obtained by TPM of binary splitting. In a way, the proposed signalling scheme is similar to intra mode singaling, where the TPM partitions correspond to most probable partitions and GPM modes correspond to remainder partitions.

The geo_partition_idx is used as an index to the lookup table that stores the cc and p pairs. As described above 140 bytes are necessary to store this table. The example blending operation for a luma block may be referred to herein as section 2.3.2 blending operation for a luma block, or simply section 2.3.2. As in the case of TPM, video encoder 200 and video decoder 300 may be configured to obtain the final prediction of the coding block by weighted averaging of first uni-prediction and second uni-prediction according to sample weights.

sampleWeightL[x][y]=GeoFilter[distScaled] if distFromLine<=0 sampleWeightL[x][y]=8 GeoFilter[distScaled] if distFromLine>0

Where sample weights are implemented as a lookup table as in Table 2 as follows:

TABLE 2

| blending filter weights | | | | | | | | | | | | | | | |
|---|---|---|---|---|---|---|---|---|---|---|---|---|---|---|
| distScaled | 0 | 1 | 2 | 3 | 4 | 5 | 6 | 7 | 8 | 9 | 10 | 11 | 12 | 13 | 14 |
| GeoFilter[distScaled] | 4 | 4 | 5 | 5 | 5 | 5 | 6 | 6 | 6 | 6 | 7 | 7 | 7 | 7 | 8 |

The number of operations for a calculation of the sample weight is on the order of 1 addition operations per sample, which has similar computational complexity as TPM. In more detail, for each sample, video encoder 200 and video decoder 300 may be configured to calculate distScaled according to the following two equations:

distFromLine=((x<<1)+1)*Dis[displacementX]+((y<<1)+1))*Dis[displacementY]-rho distScaled=min((abs(distFromLine)+8)>>4,14)

Where video encoder 200 and video decoder 300 may be configured to calculate the variable rho, displacementX and displacementY once per coding block, Dis [ ] is a lookup table with 32 entries (8 bits resolution) that store cosine value, video encoder 200 and video decoder 300 may be configured to calculate distFromLine by incrementing distFromLine for each sample with a value of 2*Dis[displacementX] in a sample row and with a value of 2*Dis[displacementY] from one sample row to the next. Therefore, slightly more than 1 additions per sample is used to obtain distFromLine value. Additionally minimum, absolute value and downshift operations may be used, which do not introduce any considerable complexity.

Video encoder 200 and video decoder 300 may be configured to implement all operations of GPM using integer arithmetic. The computational complexity of GPM may be very similar to TPM. More details regarding the blending operation may be found at, for example, JVET-O0489.

Video encoder 200 and video decoder 300 may be configured to subsample the sample weights calculated for the luma samples and use the sample weights calculated for the luma samples for chroma blending without any computation. Video encoder 200 and video decoder 300 may be configured to set the chroma sample weight at coordinate (x,y) equal to luma sample weight at coordinate (2x,2y) with respect to the top-left sample of luma block.

Video encoder 200 and video decoder 300 may be configured to use a same merge list derivation process that is used for TPM for deriving motion vectors of each partition of the GPM block. For example, video encoder 200 and video decoder 300 may be configured to predict each partition only by uni-prediction.

Video encoder 200 and video decoder 300 may be configured to sum luma sample weights (which may be calculated by blending along the triangle partition edge as shown in FIG. 8) at the four corners of a 4×4 motion storage unit. Then, video encoder 200 and video decoder 300 may be configured to compare the sum with 2 thresholds to determine whether one of two uni-prediction motion information or bi-prediction motion information is stored. Video encoder 200 and video decoder 300 may be configured to derive the bi-prediction motion information using the same process as TPM.

The current GPM design describes represents an extension to TPM. However, some differences may be harmonized during WET 15th meeting in Goteborg. Harmonization of TPM and GPM motion field storage is discussed in the following. The TPM algorithm for motion field storage only uses the position of a 4×4 unit within the CU to determine which motion vector needs to be stored, while the GPM method uses the weights used for motion compensation for the storage. Moreover, if the current algorithm for motion field storage of GPM were to be applied to TPM, the TPM storage would end up modified. There are benefits to have a unified process of storage for both TPM and GPM processes.

Harmonization of TPM and GPM weights derivation is discussed in the following. The GPM algorithm for weight derivation described for a blending operation for a luma block is different from the one used for TPM weight derivation. There are benefits to have a unified process for weight derivation for both methods.

This discloses several processes for unifying the motion field storage and the motion weight derivation of TPM and GEO.

A change of GPM motion field storage is discussed in the following.

In some examples, the motion field storage of GPM can be modified in the following way.

Video encoder 200 and video decoder 300 may be configured to use the distance from the center of each 4×4 unit to the split line so that the same equation can be used for TPM motion field storage without changing the MV stored for TPM. In some examples, video encoder 200 and video decoder 300 may be configured to derive the motion storage buffer using the following equation:

$$sx\_i=(x<<1)+4;$$

$$sy\_i=(y<<1)+4;$$

$$d=(sx\_i*\text{Dis}[displacementX]+sy\_i*\text{Dis}[displacementY]-rho);$$

$$\text{distanceScaled}=(\text{abs}(d)+\text{shiftDistanceOffset})>>\text{shiftDistance};$$

$$\text{tempMotionBuffer}[x>>2]=(\text{distanceScaled}<=16)?2:d<=0?0:1;$$

Where sx_i represents a distance between a center of an i-th 4×4 block and a split line along the x direction, sy_i represents a distance between a center of the i-th 4×4 block and a split line along the y direction, d is an intermediate variable, displacement, displacement Y, and rho represent the split line, which are calculated once per coding block, distanceScaled represents a scaled distance between the center of the i-th 4×4 block and the split line, and tempMotionBuffer represents the "motion field storage of GEO," which may be 2 for a bidirectional prediction (e.g., using list 0 and list 1), 1 for uni-direction prediction (e.g., using only list 0 or only list 1), and 0 for uni-direction prediction (e.g., using only list 1 or only list 0).

In some examples, video encoder 200 and video decoder 300 may be configured to derive the motion storage buffer using the following equation:

$$sx\_i=(x<<2)+2;$$

$$sy\_i=(y<<2)+2;$$

$$d=(sx\_i*\text{Dis}[displacementX]+sy\_i*\text{Dis}[displacementY]-rho);$$

$$\text{distanceScaled}=(\text{abs}(d)+\text{shiftDistanceOffset})>>\text{shiftDistance};$$

$$\text{tempMotionBuffer}[x>>2]=(\text{distanceScaled}<=16)?2:d<=0?0:1;$$

In some examples, video encoder 200 and video decoder 300 may be configured to derive the motion storage buffer using the following equation:

$$sx\_i=(x*4)+2.5;$$

$$y\_i=(y*4)+2.5;$$

$$d=(sx\_i*\text{Dis}[displacementX]+sy\_i*\text{Dis}[displacementY]-rho);$$

$$\text{distanceScaled}=(\text{abs}(d)+\text{shiftDistanceOffset})>>\text{shiftDistance};$$

$$\text{tempMotionBuffer}[x>>2]=(\text{distanceScaled}<=16)?2:d<=0?0:1;$$

Video encoder 200 and video decoder 300 may be configured to apply scaling to achieve integer operations.

With x (respectively y) ranging from 0 to the width (respectively height) of the block with a step of 4. Where video encoder 200 and video decoder 300 may be configured to derive displacementX, displacementY, Dis, and rho using a blending operation for a luma block (See Table 2) and tempMotionBuffer equals to 0 indicates storage of Mv0, equals to 1 to storage of Mv1 and equals to 2 indicates storage of biMv using motion field storage. For example, video encoder 200 and video decoder 300 may be configured to derive displacementX, displacementY, Dis and rho according to the process described in section 2.3.2. In some examples, tempMotionBuffer equals to 2 indicate storage of biMv using the process described in section 2.2.4.

Change of GPM motion weight derivation is discussed in the following. In some examples, video encoder 200 and video decoder 300 may be configured to change the weights used for the blending part in GPM so that the weights used for the blending part in GPM use TPM weight process for blending along the triangle partition edge (see FIG. 9). For example, video encoder 200 and video decoder 300 may be configured to change the weights used for the blending part in GPM so that the weights used for the blending part in GPM use TPM weight process described in section 2.2.3. For example, video encoder 200 and video decoder 300 may be configured to identify a split edge, generate sub-block that includes the split edge arranged in within the sub-block to correspond to a TPM position, and derive GPM motion weights using a TPM weight processes.

Video encoder 200 and video decoder 300 may be configured to change the angles used by GPM so that the angles used by GPM match TPM angles. For example, video encoder 200 and video decoder 300 may be configured to use GPM to have equivalent angles to TPM (e.g., more than 32 angles). Said differently, video encoder 200 and video decoder 300 may be configured to use GPM to select an angle for a split line from a plurality of angles, each angle of the plurality of angles corresponding to an N:M ratio of samples of the current block, wherein N and M are integers. For instance, rather than using 32 angles separated by 11.25 degrees, video encoder 200 and video decoder 300 may apply angles corresponding to a 1:2 ratio, 1:4 ratio, 1:1 ratio, 2:1 ratio, 0:1 ratio, or 1:0 ratio.

Video encoder 200 and video decoder 300 may be configured to shift the start and end position of the weighted area with an offset to replicate GPM multiple offsets. Said differently, a video coder (e.g., video encoder 200 or video decoder 300) may determine a split line dividing the current block into a first partition and a second partition, where, to determine the split line, the video coder is configured to select an angle for the split line that is not at a corner of a current block. In some examples, the video coder may determine a weighted area based on the angle for the split line and shift the weighted area based on the distance offset from the center of the current block to generated a shifted weighted area.

Figure 11:
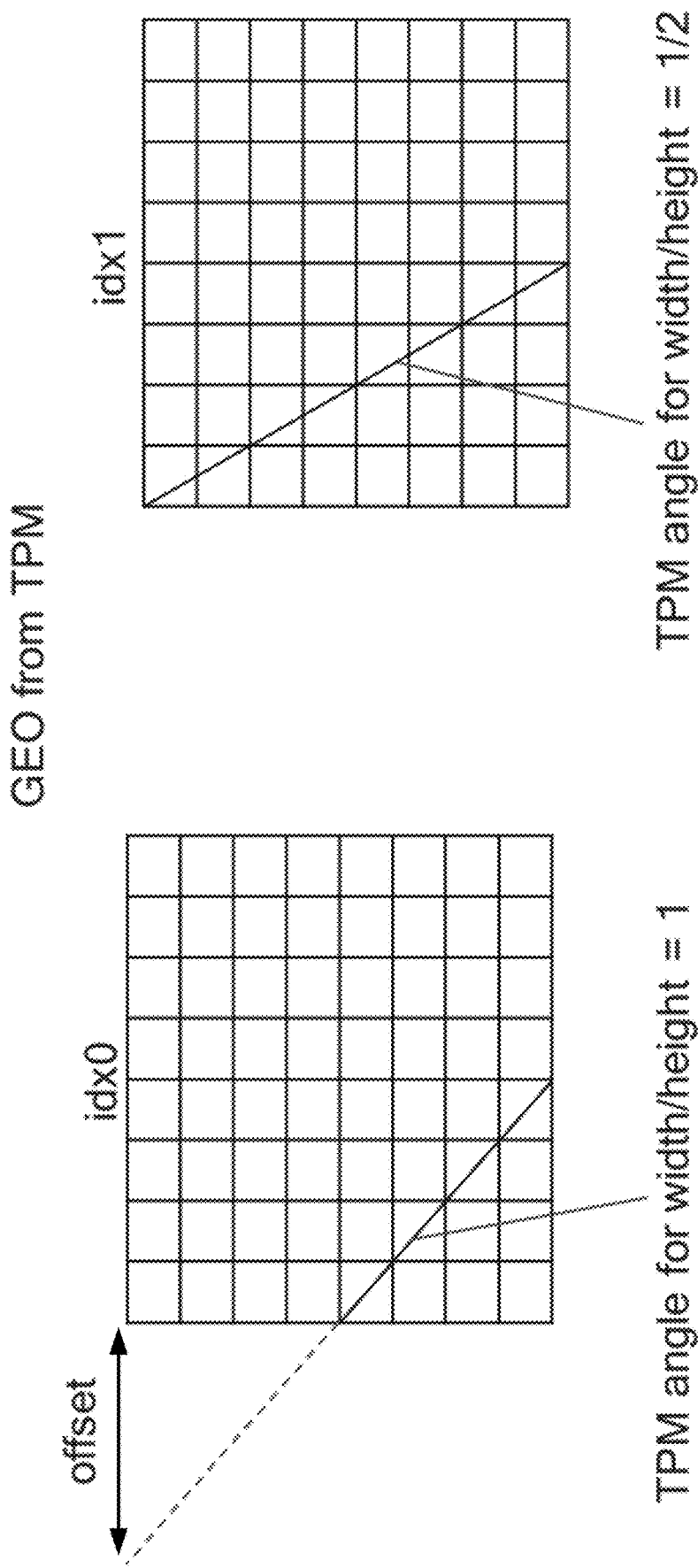
FIG. 11 is a conceptual diagram illustrating example geometric partition mode (GPM) harmonization with TPM.

Video encoder 200 and video decoder 300 may be configured to use TPM angles from different block sizes along with GEO, to allow more GPM angles. Examples are presented in FIG. 11. FIG. 11 is a conceptual diagram illustrating example GPM harmonization with TPM.

Figure 12:
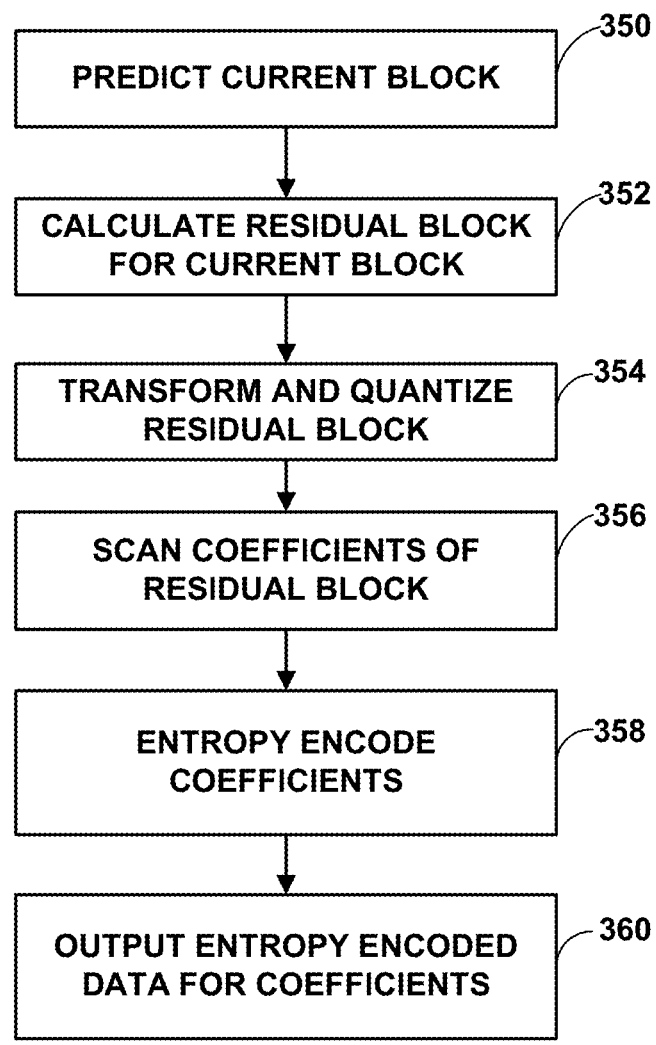
FIG. 12 is a flowchart illustrating a first example method for encoding a current block.

FIG. 12 is a flowchart illustrating an example method for encoding a current block. The current block may comprise a current CU. Although described with respect to video encoder 200 (FIGS. 1 and 3), it should be understood that other devices may be configured to perform a method similar to that of FIG. 12.

In this example, video encoder 200 predicts the current block (350). For example, video encoder 200 may form a prediction block for the current block. In some examples, video encoder 200 may form a prediction block using techniques described herein for geometric partition mode. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 13:
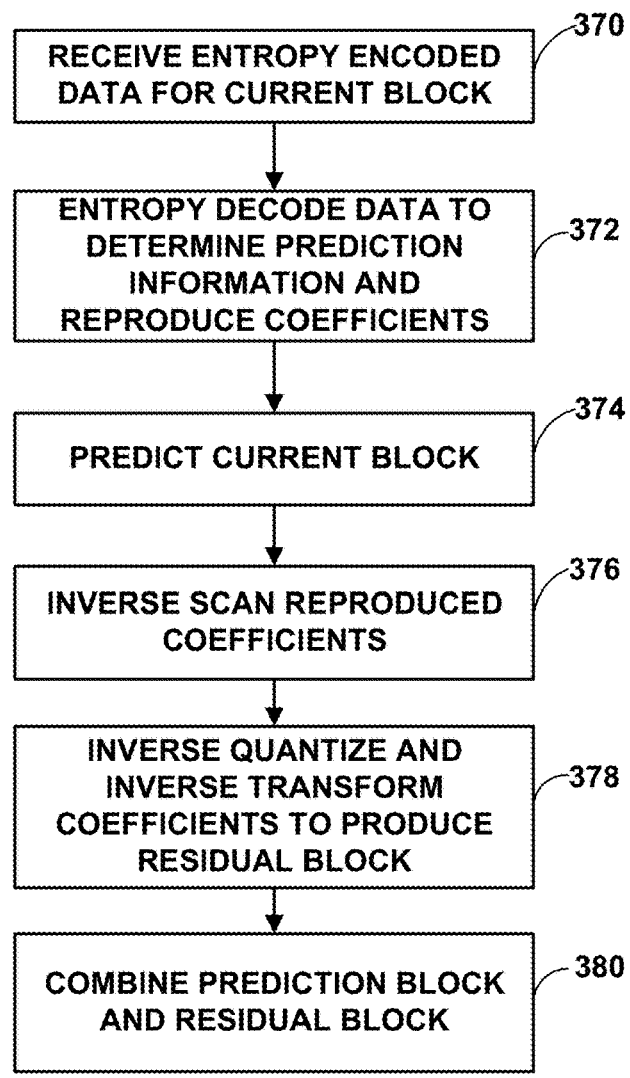
FIG. 13 is a flowchart illustrating an example method for decoding a current block of video data.

FIG. 13 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 13.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. In some examples, video decoder 300 may form a prediction block using techniques described herein for geometric partition mode. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 14:
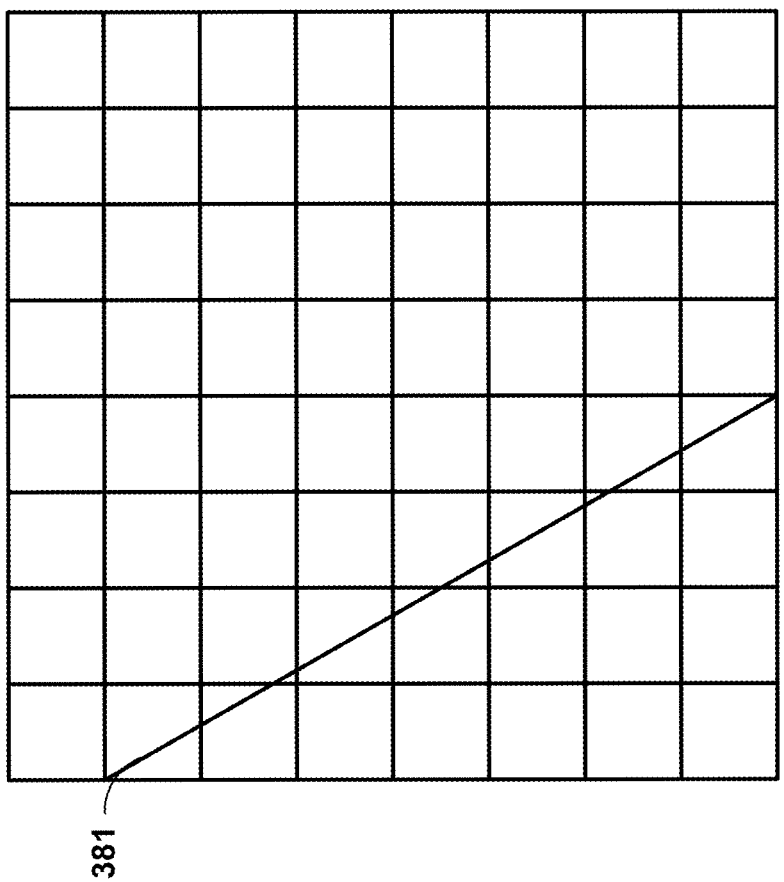
FIG. 14 is a conceptual diagram illustrating a second example GPM harmonization with TPM.

FIG. 14 is a conceptual diagram illustrating example GPM harmonization with TPM. As shown, the GPM angle for split line 381 has a width-to-height ratio that is not a multiple of 2. That is, split line 381 has a width-to-height ratio of 4 to 7. In other examples, a width-to-height ratio that is not a multiple of 2 may be different from 4 to 7, for example, 3 to 7, 2 to 7, 3 to 8, and so on.

Figure 15:
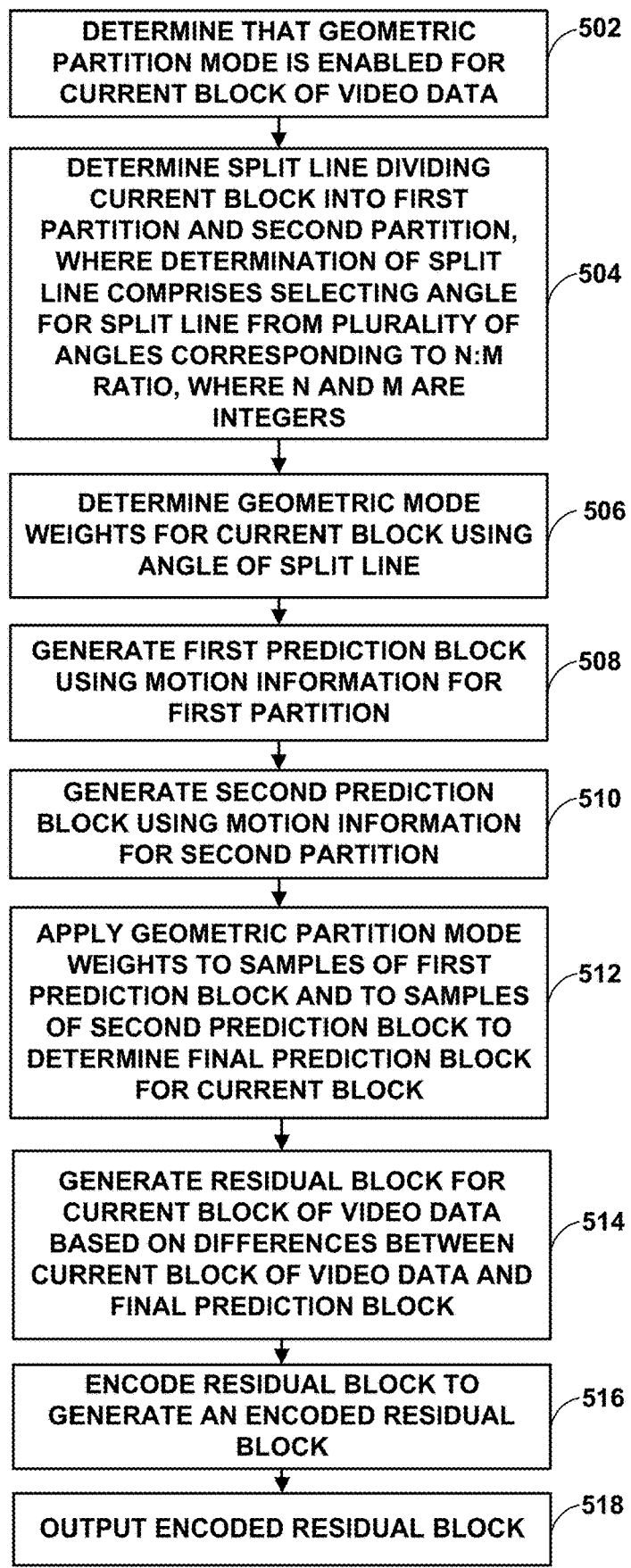
FIG. 15 is a flowchart illustrating an example method for encoding a current block using a plurality of angles, each angle of the plurality of angles corresponding to an N:M ratio of samples of a current block, in accordance with the techniques of the disclosure.

FIG. 15 is a flowchart illustrating an example method for encoding a current block using a plurality of angles, each angle of the plurality of angles corresponding to an N:M ratio of samples of a current block, in accordance with the techniques of the disclosure. Video encoder 200 (e.g., mode selection unit 202) may determine that a geometric partition mode is enabled for a current block of the video data (502). Video encoder 200 (e.g., mode selection unit 202) may determine a split line dividing the current block into a first partition and a second partition, wherein determining the split line comprises selecting an angle for the split line from a plurality of angles, each angle of the plurality of angles corresponding to an N:M ratio of samples of the current block, where N and M are integers, and where the split line is not at a corner of the current block (504). Video encoder 200 (e.g., mode selection unit 202) may determine geometric mode weights for the current block using the angle of the split line (506). Video encoder 200 (e.g., mode selection unit 202) may generate a first partition block using motion information for the first partition (508). Video encoder 200 (e.g., mode selection unit 202) may generate a second partition block using motion information for the second partition (510). Video encoder 200 (e.g., mode selection unit 202) may apply the geometric partition mode weights to samples of the first prediction block and to samples of the second prediction block to determine a final prediction block for the current block (512). Video encoder 200 (e.g., residual generation unit 204) may generate a residual block for the current block of video data based on differences between the current block of the video data and the final prediction block (514). Video encoder 200 (e.g., entropy encoding unit 220) may encode the residual block to generate an encoded residual block (516) and output the encoded residual block (518).

Figure 16:
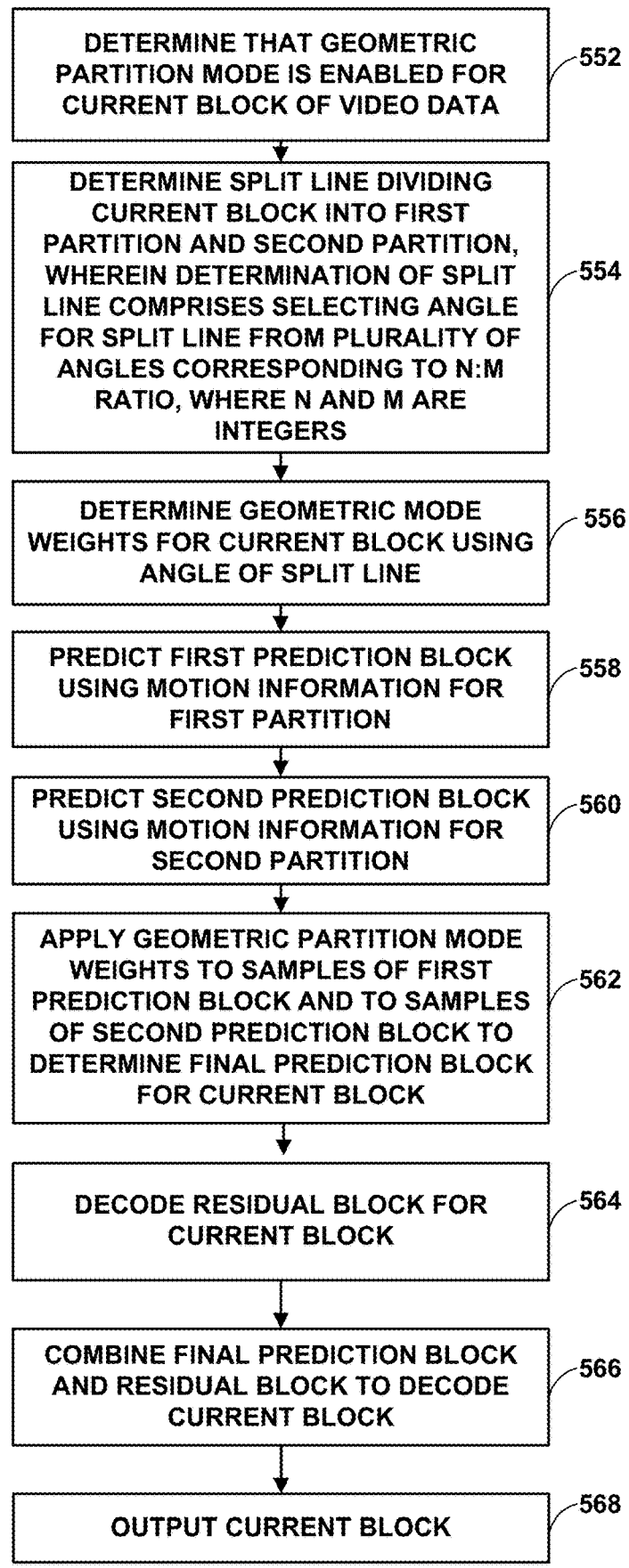
FIG. 16 is a flowchart illustrating an example method for decoding a current block of video data using a plurality of angles, each angle of the plurality of angles corresponding to an N:M ratio of samples of a current block, in accordance with the techniques of the disclosure.

FIG. 16 is a flowchart illustrating an example method for decoding a current block of video data using a plurality of angles, each angle of the plurality of angles corresponding to an N:M ratio of samples of a current block, in accordance with the techniques of the disclosure. Video decoder 300 (e.g., prediction processing unit 304) may determine that a geometric partition mode is enabled for a current block of the video data (552). Video decoder 300 (e.g., prediction processing unit 304) may determine a split line dividing the current block into a first partition and a second partition, wherein the determination of the split line comprises selecting an angle for the split line from a plurality of angles, each angle of the plurality of angles corresponding to an N:M ratio of samples of a current block, wherein N and M are integers, and wherein the split line is not at a corner of the current block (554). Video decoder 300 (e.g., prediction processing unit 304) may determine geometric mode weights for the current block using the angle of the split line (556). Video decoder 300 (e.g., prediction processing unit 304) may generate a first prediction block using motion information for the first partition (558). Video decoder 300 (e.g., prediction processing unit 304) may generate a second prediction block using motion information for the second partition (560). Video decoder 300 (e.g., prediction processing unit 304) may apply the geometric partition mode weights to samples of the first prediction block and to samples of the second prediction block to determine a final prediction block for the current block (562). Video decoder 300 (e.g., entropy decoding unit 302 with inverse quantitation unit 306 and inverse transform processing unit 308) may decode a residual block for the current block (564). Video decoder 300 (e.g., reconstruction unit 310) may combine the final prediction block and the residual block to decode the current block (566). Video decoder 300 (e.g., DPB 314) may output the current block (568).

Figure 17:
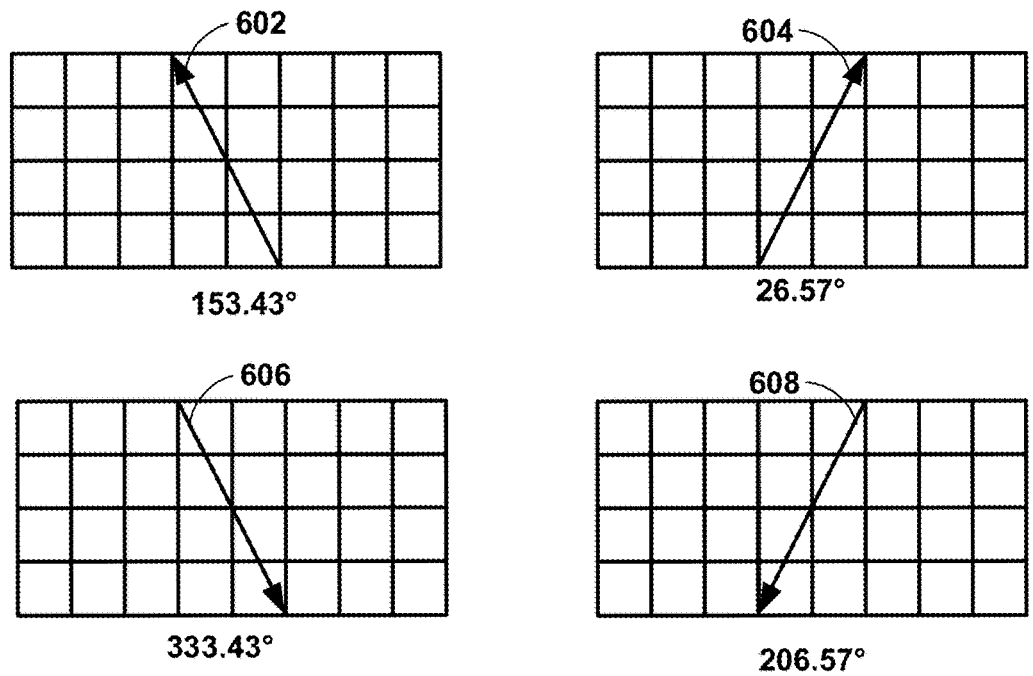
FIG. 17 is a conceptual diagram illustrating example angles for a block with a ratio of 1:2, in accordance with the techniques of the disclosure.

FIG. 17 is a conceptual diagram illustrating example angles for a block with a ratio of 1:2, in accordance with the techniques of the disclosure. One or more of the example angles for a block of FIG. 17 may be included in a set of angles used for geometric partition mode. As shown, FIG. 17 includes split line 602 comprising an angle of 153.43°, split line 604 comprising an angle of 26.57°, split line 606 comprising an angle of 333.43°, split line 608 comprising an angle of 208.57°.

Figure 18:
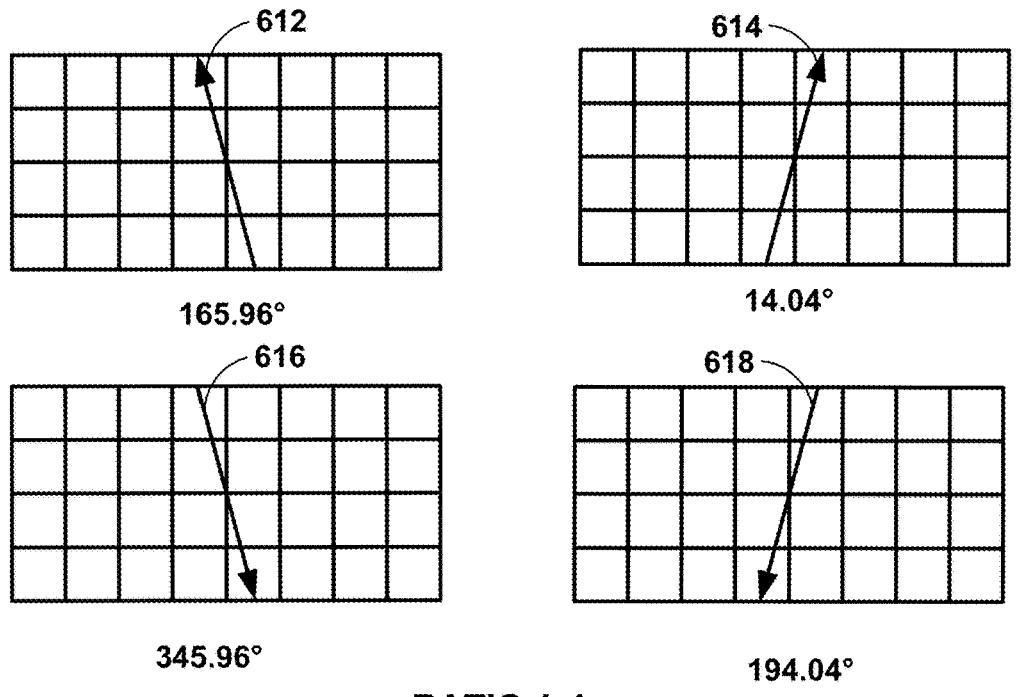
FIG. 18 is a conceptual diagram illustrating example angles for a block with a ratio of 1:4, in accordance with the techniques of the disclosure.

FIG. 18 is a conceptual diagram illustrating example angles for a block with a ratio of 1:4, in accordance with the techniques of the disclosure. One or more of the example angles for a block of FIG. 18 may be included in a set of angles used for geometric partition mode. As shown, FIG. 18 includes split line 612 comprising an angle of 165.96°, split line 614 comprising an angle of 14.04°, split line 616 comprising an angle of 345.96°, split line 618 comprising an angle of 194.04°.

Figure 19:
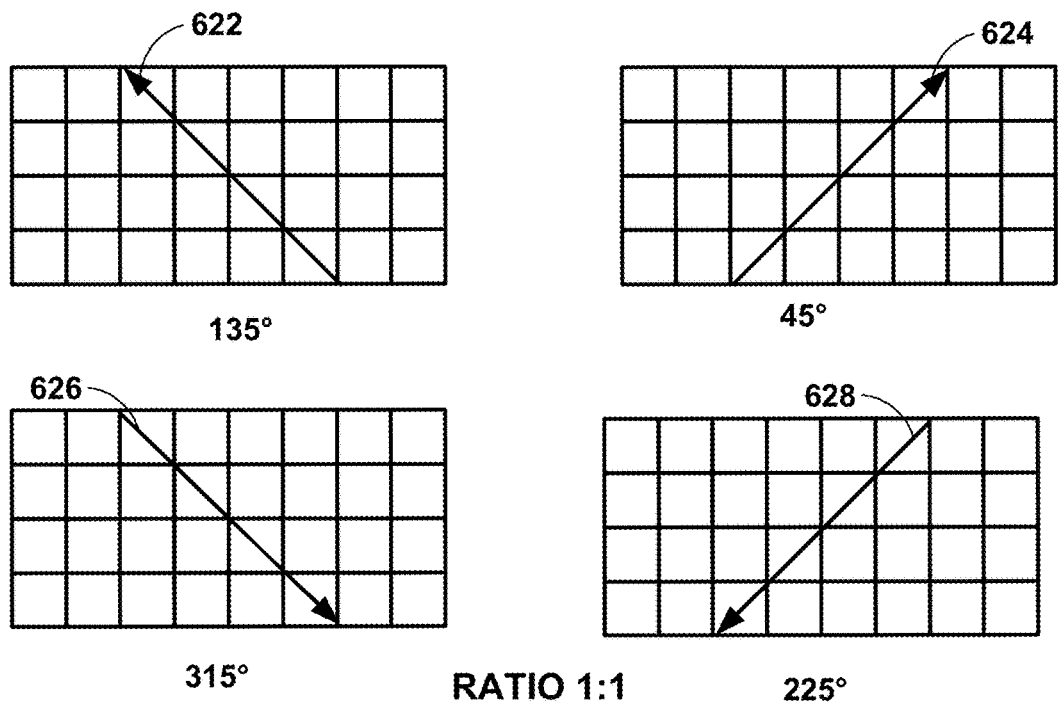
FIG. 19 is a conceptual diagram illustrating example angles for a block with a ratio of 1:1, in accordance with the techniques of the disclosure.

FIG. 19 is a conceptual diagram illustrating example angles for a block with a ratio of 1:1, in accordance with the techniques of the disclosure. One or more of the example angles for a block of FIG. 19 may be included in a set angles used for geometric partition mode. As shown, FIG. 19 includes split line 622 comprising an angle of 135°, split line 624 comprising an angle of 45°, split line 626 comprising an angle of 315°, split line 628 comprising an angle of 225°.

Figure 20:
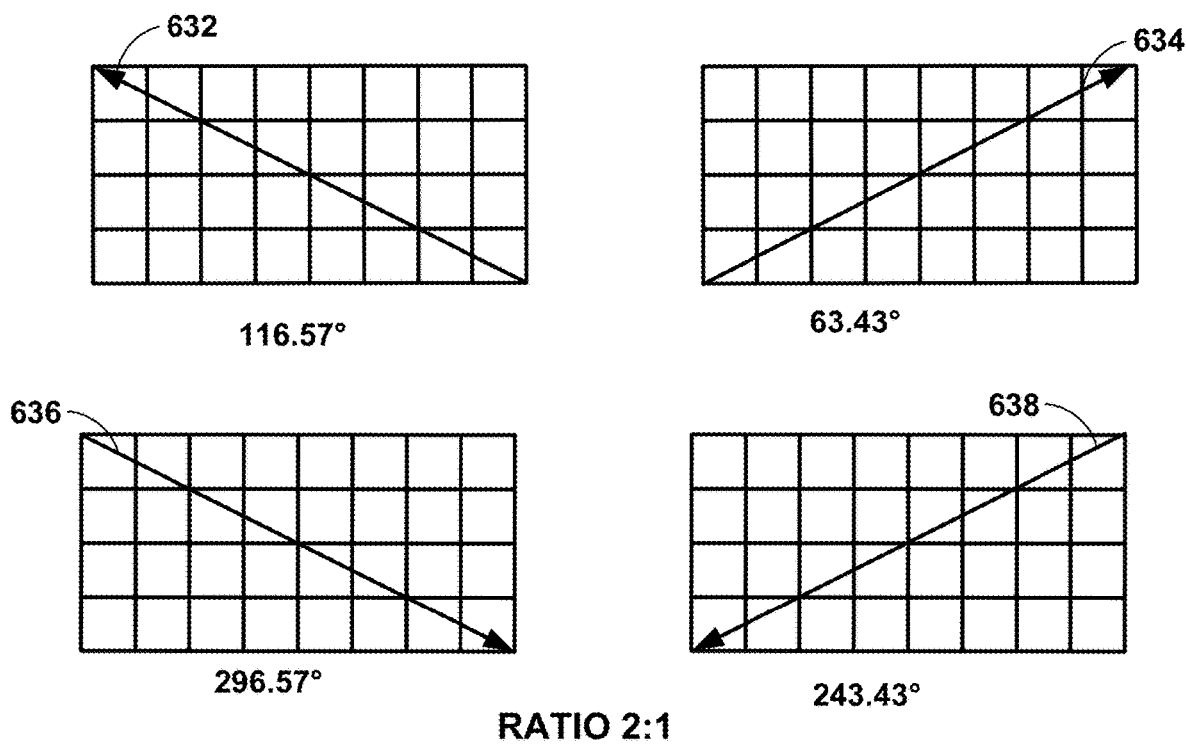
FIG. 20 is a conceptual diagram illustrating example angles for a block with a ratio of 2:1, in accordance with the techniques of the disclosure.

FIG. 20 is a conceptual diagram illustrating example angles for a block with a ratio of 2:1, in accordance with the techniques of the disclosure. One or more of the example angles for a block of FIG. 20 may be included in a set angles used for geometric partition mode. As shown, FIG. 20 includes split line 632 comprising an angle of 116.57°, split line 634 comprising an angle of 63.43°, split line 636 comprising an angle of 296.57°, split line 638 comprising an angle of 243.43°.

Figure 21:
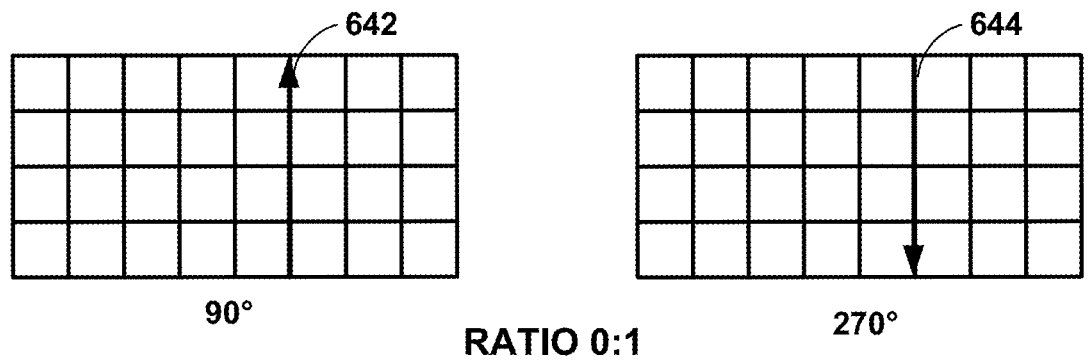
FIG. 21 is a conceptual diagram illustrating example angles for a block with a ratio of 0:1, in accordance with the techniques of the disclosure.

FIG. 21 is a conceptual diagram illustrating example angles for a block with a ratio of 0:1, in accordance with the techniques of the disclosure. One or more of the example angles for a block of FIG. 21 may be included in a set of angles used for geometric partition mode. As shown, FIG. 21 includes split line 642 comprising an angle of 90° and split line 644 comprising an angle of 270°.

Figure 22:
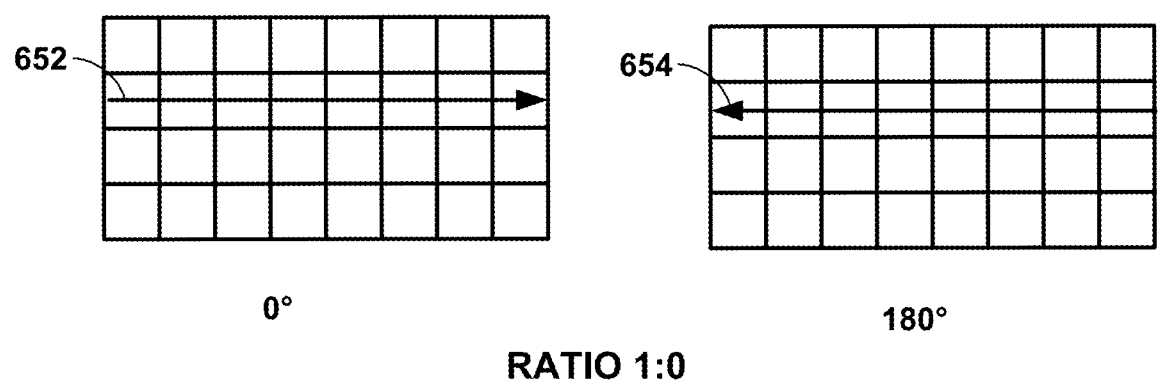
FIG. 22 is a conceptual diagram illustrating example angles for a block with a ratio of 1:0, in accordance with the techniques of the disclosure.

FIG. 22 is a conceptual diagram illustrating example angles for a block with a ratio of 1:0, in accordance with the techniques of the disclosure. One or more of the example angles for a block of FIG. 22 may be included in a set of angles used for geometric partition mode. As shown, FIG. 22 includes split line 652 comprising an angle of 0° and split line 654 comprising an angle of 180°.

The angles illustrated in FIGS. 17-22 may comprise characteristics that the tangent of the proposed angles is a power-of-2 number, where most of the multiplications required for wIdx(x,y) can be replaced by using bit-shifting.

$$wIdx(x, y) = x * \cos(\alpha) + y * \cos\left(\alpha + \frac{\pi}{2}\right) - \quad \text{EQUATION 6}$$

$$\left(\rho + \frac{W}{2} * \cos(\alpha) + \frac{H}{2} * \cos\left(\alpha + \frac{\pi}{2}\right)\right)$$

$$= x * \cos(\alpha) - y * \sin(\alpha) - \quad \text{EQUATION 7}$$

$$\left(\rho + \frac{W}{2} * \cos(\alpha) - \frac{H}{2} * \sin(\alpha)\right)$$

$$= \left(x - \frac{W}{2}\right) * \cos(\alpha) - \left(y - \frac{H}{2}\right) * \sin(\alpha) - \rho \quad \text{EQUATION 8}$$

$$= \cos(\alpha) * \left(\left(x - \frac{W}{2}\right) - \left(y - \frac{H}{2}\right) * \tan(\alpha)\right) - \rho \quad \text{EQUATION 9}$$

Using those angles that having powers of 2 as tangent, a video coder (e.g., video encoder 200 or video decoder 300) can replace one multiplication per sample by using bit-shifting operations in implementations where GPM weight values would be computed 'on the fly'. As triangle functions may be implemented as integer-precision operation, reduction of one multiplication helps supress rounding error.

In some implementations, it can be preferred to store masks with the weights for each CU size and each partition to reduce the number of operations needed by GEO, because weight values repeat row-by-row with phase shift. This behavior can be formulated by using EQUATION 10, as follows:

$$wIdx(x, y) = \cos(\alpha) * \left(\left(x - \frac{W}{2}\right) - \left(y - \frac{H}{2}\right) * \tan(\alpha)\right) - \quad \text{EQUATION 10}$$

$$\rho + \cos(\alpha) * (\tan(\alpha) - \tan(\alpha))$$

$$= \cos(\alpha) * \left(\left(x - \tan(\alpha) - \frac{W}{2}\right) - \quad \text{EQUATION 11}$$

$$\left(y - 1 - \frac{H}{2}\right) * \tan(\alpha)\right) - \rho$$

$$= wIdx(x - \tan(\alpha), y - 1) \quad \text{EQUATION 12}$$

wIdx(x,y) can be interpreted as inferring one of the weight value assigned to the integer samples on immediately previous row, and thus one row of weight values is the only thing required for mask storage.

In some cases, the value of tan($\alpha$) may not be integer, cot($\alpha$) is used as replacement and thus the weight values repeat column-by-column with phase shift as in EQUATION 12. As can be seen, wIdx(x,y) can be interpreted as inferring one of the weight value assigned to the integer samples on immediately left column, and thus one column of weight values is the only thing required for mask storage.

$$wIdx(x, y) = \cos(\alpha) * \left(\left(x - \frac{W}{2}\right) - \left(y - \frac{H}{2}\right) * \tan(\alpha)\right) - \quad \text{EQUATION 13}$$

$$\rho + \cos(\alpha) * (1 - 1)$$

$$= \cos(\alpha) * \left(\left(x - 1 - \frac{W}{2}\right) - \quad \text{EQUATION 14}$$

$$\left(y - \cot(\alpha) - \frac{H}{2}\right) * \tan(\alpha)\right) - \rho$$

$$= wIdx(x - 1, y - \cot(\alpha)) \quad \text{EQUATION 15}$$

In Gao, et al. "Geometric Merge Mode (GEO)," Joint Video Experts Team (JVET) of ITU-T SG 16 WP 3 and ISO/IEC JTC 1/SC 29/WG 11, 16th Meeting: Geneva, CH, 1-11 Oct. 2019, JVET-P0068-v2 (hereinafter "JVET-P0068,"), most of the angles have non-integer values for tan($\alpha$), meaning that (x-tan($\alpha$), y-1) and (x-1, y-cot($\alpha$)) does not fall on the center of a pixel, and this property cannot be used.

In accordance with the techniques of the disclosure, a video coder (e.g., video encoder 200 or video decoder 300) may be configured to align the derivation process of TPM to GPM and thus TPM mode can share the same function as GPM has to derive its weight values. With this, TPM mode may become the same as a particular GPM mode with diagonal (or anti-diagonal) split and an edge index equal to zero.

A non-limiting illustrative list of examples of the techniques of this disclosure is provided below.

Example 1. A method of coding video data, the method comprising: determining that a geometric partition mode is enabled for a current block; determining a split line dividing the current block into a first partition and a second partition; deriving, for each 4×4 block of the current block, a motion vector based on a distance from a center of each respective 4×4 unit of the current block to the split line, wherein deriving the motion vector comprises selecting uni-prediction with a first prediction motion vector, uni-prediction with a second prediction motion vector, or bi-prediction with the first prediction motion vector and the second prediction motion vector for the respective 4×4 unit according to the distance of the respective 4×4 unit of the current block to the split line and without using a weight for motion compensation; and determining a prediction block for the current block using the motion vector.

Example 2. The method of example 1, wherein deriving the motion vector comprises using the following equation:

$$sx\_i=(x<<1)+4;$$

$$sy\_i=(y<<1)+4;$$

$$d=(sx\_i*Dis[displacementX]+sy\_i*Dis[displacementY]-rho);$$

$$distanceScaled=(abs(d)+shiftDistanceOffset)>>shiftDistance;$$

$$tempMotionBuffer[x>>2]=(distanceScaled<=16)?2:d<=0?0:1;$$

wherein sx_i represents a distance between a center of an i-th 4×4 block of the current block and a split line along the x direction, sy_i represents a distance between a center of the i-th 4×4 block and a split line along the y direction, d is an intermediate variable, displacement, displacement Y, and rho represent the split line, distanceScaled represents a scaled distance between the center of the i-th 4×4 block and the split line, and tempMotionBuffer represents whether to derive the motion vector using the uni-prediction with the first prediction motion vector, the uni-prediction with the second prediction motion vector, or the bi-prediction with the first prediction motion vector and the second prediction motion vector.

Example 3. The method of example 1, wherein deriving the motion vector comprises using the following equation:

$$sx\_i=(x<<1)+2;$$

$$sy\_i=(y<<1)+2;$$

$$d=(sx\_i*Dis[displacementX]+sy\_i*Dis[displacementY]-rho);$$

$$distanceScaled=(abs(d)+shiftDistanceOffset)>>shiftDistance;$$

$$tempMotionBuffer[x>>2]=(distanceScaled<=16)?2:d<=0?0:1;$$

wherein sx_i represents a distance between a center of an i-th 4×4 block of the current block and a split line along the x direction, sy_i represents a distance between a center of the i-th 4×4 block and a split line along the y direction, d is an intermediate variable, displacement, displacement Y, and rho represent the split line, distanceScaled represents a scaled distance between the center of the i-th 4×4 block and the split line, and tempMotionBuffer represents whether to derive the motion vector using the uni-prediction with the first prediction motion vector, the uni-prediction with the second prediction motion vector, or the bi-prediction with the first prediction motion vector and the second prediction motion vector.

Example 4. The method of example 1, wherein deriving the motion vector comprises using the following equation:

$$sx\_i=(x<<1)+2.5;$$

$$sy\_i=(y<<1)+2.5;$$

$$d=(sx\_i*Dis[displacementX]+sy\_i*Dis[displacementY]-rho);$$

$$distanceScaled=(abs(d)+shiftDistanceOffset)>>shiftDistance;$$

$$tempMotionBuffer[x>>2]=(distanceScaled<=16)?2:d<=0?0:1;$$

wherein sx_i represents a distance between a center of an i-th 4×4 block of the current block and a split line along the x direction, sy_i represents a distance between a center of the i-th 4×4 block and a split line along the y direction, d is an intermediate variable, displacement, displacement Y, and rho represent the split line, distanceScaled represents a scaled distance between the center of the i-th 4×4 block and the split line, and tempMotionBuffer represents whether to derive the motion vector using the uni-prediction with the first prediction motion vector, the uni-prediction with the second prediction motion vector, or the bi-prediction with the first prediction motion vector and the second prediction motion vector.

Example 5. The method of any of examples 2-4, wherein deriving the motion vector comprises: deriving the motion vector using uni-prediction using the first prediction motion vector when tempMotionBuffer equals 0; deriving the motion vector using uni-prediction using the second prediction motion vector when tempMotionBuffer equals 1; and deriving the motion vector using bi-prediction using the first prediction motion vector and the second prediction motion vector when tempMotionBuffer equals 2.

Example 6. A method of coding video data, the method comprising: determining that a geometric partition mode is enabled for a current block; determining a split line dividing the current block into a first partition and a second partition; determining a sub-block of the current block such that the sub-block includes a triangle partition edge formed by the split line; deriving triangle partition mode weights by blending along the triangle partition edge for a triangular partition mode; determining geometric mode weights for the current block using the triangle partition mode weights; and determining a prediction block using the geometric partition mode weights.

Example 7. The method of example 6, wherein the split line is arranged at one angle of a plurality of angles for the geometric partition mode and wherein the plurality of angles for the geometric partition mode includes each angle in a plurality of angles for the triangular partition mode.

Example 8. The method of any of examples 1-7, wherein coding comprises decoding.

Example 9. The method of any of examples 1-7, wherein coding comprises encoding.

Example 10. A device for coding video data, the device comprising one or more means for performing the method of any of examples 1-9.

Example 11. The device of example 10, wherein the one or more means comprise one or more processors implemented in circuitry.

Example 12. The device of any of examples 10 and 11, further comprising a memory to store the video data.

Example 13. The device of any of examples 10-12, further comprising a display configured to display decoded video data.

Example 14. The device of any of examples 10-13, wherein the device comprises one or more of a camera, a computer, a mobile device, a broadcast receiver device, or a set-top box.

Example 15. The device of any of examples 10-14, wherein the device comprises a video decoder.

Example 16. The device of any of examples 10-15, wherein the device comprises a video encoder.

Example 17. A computer-readable storage medium having stored thereon instructions that, when executed, cause one or more processors to perform the method of any of examples 1-10.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a geometric partition mode is enabled for a current block of the video data;
   determining a split line dividing the current block into a first partition and a second partition, wherein determining the split line comprises selecting an angle for the split line from a plurality of angles, each angle of the plurality of angles corresponding to an N:M width-to-height ratio of samples of the current block, wherein N and M are integers, and wherein the split line is not at a corner of the current block;
   determining geometric mode weights for the current block using the angle of the split line;
   generating a first prediction block using motion information for the first partition;
   generating a second prediction block using motion information for the second partition;
   applying the geometric partition mode weights to samples of the first prediction block and to samples of the second prediction block to determine a final prediction block for the current block;
   decoding a residual block for the current block; and
   combining the final prediction block and the residual block to decode the current block.

2. The method of claim 1, wherein selecting the angle for the split line comprises:
   receiving a value indicating an angle index; and
   determining the angle for the split line using the value indicating the angle index.

3. The method of claim 1, wherein determining the split line further comprises determining a distance offset from a center of the current block.

4. The method of claim 3, wherein determining the geometric mode weights comprises:
   determining a weighted area based on the angle for the split line;
   shifting the weighted area based on the distance offset from the center of the current block to generated a shifted weighted area; and
   determining the geometric mode weights based on the shifted weighted area.

5. The method of claim 3, wherein determining the distance offset comprises:
   receiving a value indicating an offset index; and
   determining the distance offset for the split line using the value indicating the offset index.

6. The method of claim 1, wherein the first partition comprises more samples than the second partition.

7. The method of claim 1, wherein determining that the geometric partition mode is enabled for the current block comprises receiving a value indicating that the geometric partition mode is enabled for the current block.

8. The method of claim 1, wherein determining the geometric mode weights comprises determining a pixel value P of the prediction block by calculating:

$$P=\tfrac{4}{8}*P_1+\tfrac{4}{8}*P_2,$$

wherein $P_1$ is a first reference pixel value of a first pixel of the first prediction block and positioned at the split line and wherein $P_2$ is a second reference pixel value of a second pixel of the second prediction block and positioned at the split line.

9. The method of claim 1, wherein determining the geometric mode weights comprises determining a pixel value P of the prediction block by calculating:

$$P=\tfrac{3}{8}*P_1+\tfrac{5}{8}*P_2,$$

wherein $P_1$ is a first reference pixel value of a first pixel of the first prediction block and offset from the split line by one sample and wherein $P_2$ is a second reference pixel value of a second pixel of the second prediction block and offset from the split line by one sample.

10. A method of encoding video data, the method comprising:
determining that a geometric partition mode is enabled for a current block of the video data;
determining a split line dividing the current block into a first partition and a second partition, wherein determining the split line comprises selecting an angle for the split line from a plurality of angles, each angle of the plurality of angles corresponding to an N:M width-to-height ratio of samples of the current block, wherein N and M are integers, and wherein the split line is not at a corner of the current block;
determining geometric mode weights for the current block using the angle of the split line;
generating a first prediction block using motion information for the first partition;
generating a second prediction block using motion information for the second partition;
applying the geometric partition mode weights to samples of the first prediction block and to samples of the second prediction block to determine a final prediction block for the current block;
generating a residual block for the current block of video data based on differences between the current block of the video data and the final prediction block; and
encoding the residual block.

11. The method of claim 10, further comprising signaling a value indicating an angle index.

12. The method of claim 10, wherein determining the split line further comprises determining a distance offset from a center of the current block.

13. The method of claim 12, wherein determining the geometric mode weights comprises:
determining a weighted area based on the angle for the split line;
shifting the weighted area based on the distance offset from the center of the current block to generated a shifted weighted area; and
determining the geometric mode weights based on the shifted weighted area.

14. The method of claim 12, further comprising:
determining an offset index using the distance offset from the center of the current block; and
signaling a value indicating the offset index.

15. The method of claim 10, wherein the first partition comprises more samples than the second partition.

16. The method of claim 10, wherein further comprising signaling a value indicating that the geometric partition mode is enabled for the current block.

17. The method of claim 10, wherein determining the geometric mode weights comprises determining a pixel value P of the prediction block by calculating:

$$P=\tfrac{4}{8}*P_1+\tfrac{4}{8}*P_2$$

wherein $P_1$ is a first reference pixel value of a first pixel of the first prediction block and positioned at the split line and wherein $P_2$ is a second reference pixel value of a second pixel of the second prediction block and positioned at the split line.

18. The method of claim 10, wherein determining the geometric mode weights comprises determining a pixel value P of the prediction block by calculating:

$$P=\tfrac{3}{8}*P_1+\tfrac{5}{8}*P_2,$$

wherein $P_1$ is a first reference pixel value of a first pixel of the first prediction block and offset from the split line by one sample and wherein $P_2$ is a second reference pixel value of a second pixel of the second prediction block and offset from the split line by one sample.

19. A device for decoding video data, the device comprising:
memory configured to store the video data; and
one or more processors implemented in circuitry and configured to:
determine that a geometric partition mode is enabled for a current block of the video data;
determine a split line dividing the current block into a first partition and a second partition, wherein, to determine the split line, the one or more processors are configured to select an angle for the split line from a plurality of angles, each angle of the plurality of angles corresponding to an N:M width-to-height ratio of samples of the current block, wherein N and M are integers, and wherein the split line is not at a corner of the current block;
determine geometric mode weights for the current block using the angle of the split line;
generate a first prediction block using motion information for the first partition;
generate a second prediction block using motion information for the second partition;
apply the geometric partition mode weights to samples of the first prediction block and to samples of the second prediction block to determine a final prediction block for the current block;
decode a residual block for the current block; and
combine the final prediction block and the residual block to decode the current block.

20. The device of claim 19, wherein, to select the angle for the split line, the one or more processors are configured to:
receive a value indicating an angle index; and
determine the angle for the split line using the value indicating the angle index.

21. The device of claim 19, wherein, to determine the split line, the one or more processors are configured to determine a distance offset from a center of the current block.

22. The device of claim 21, wherein, to determine the geometric mode weights, the one or more processors are configured to:
  determine a weighted area based on the angle for the split line;
  shift the weighted area based on the distance offset from the center of the current block to generated a shifted weighted area; and
  determine the geometric mode weights based on the shifted weighted area.

23. The device of claim 21, wherein, to determine the distance offset, the one or more processors are configured to:
  receive a value indicating an offset index; and
  determine the distance offset for the split line using the value indicating the offset index.

24. The device of claim 19, wherein the first partition comprises more samples than the second partition.

25. The device of claim 19, wherein, to determine that the geometric partition mode is enabled for the current block, the one or more processors are configured to receive a value indicating that the geometric partition mode is enabled for the current block.

26. A device for encoding video data, the device comprising:
  memory configured to store the video data; and
  one or more processors implemented in circuitry and configured to:
    determine that a geometric partition mode is enabled for a current block of the video data;
    determine a split line dividing the current block into a first partition and a second partition, wherein, to determine the split line, the one or more processors are configured to select an angle for the split line from a plurality of angles, each angle of the plurality of angles corresponding to an N:M width-to-height ratio of samples of the current block, wherein N and M are integer values, and wherein the split line is not at a corner of the current block;
    determine geometric mode weights for the current block using the angle of the split line;
    generate a first prediction block using motion information for the first partition;
    generate a second prediction block using motion information for the second partition;
    apply the geometric partition mode weights to samples of the first prediction block and to samples of the second prediction block to determine a final prediction block for the current block;
    generate a residual block for the current block of video data based on differences between the current block of the video data and the final prediction block; and
    encode the residual block.

27. The device of claim 26, wherein the one or more processors are configured to signal a value indicating an angle index.

28. The device of claim 26, wherein, to determine the split line, the one or more processors are configured to determine a distance offset from a center of the current block.

29. The device of claim 28, wherein, to determine the geometric mode weights, the one or more processors are configured to:
  determine a weighted area based on the angle for the split line; and
  shift the weighted area based on the distance offset from the center of the current block to generated a shifted weighted area.

30. The method of claim 1, wherein the plurality of angles comprises an angle corresponding to a 1:2 width-to-height ratio of samples of the current block, wherein N equal 1, and M equals 2.

* * * * *